(12) United States Patent
Sharma et al.

(10) Patent No.: US 12,456,456 B2
(45) Date of Patent: *Oct. 28, 2025

(54) DATA AUGMENTATION SYSTEM AND METHOD FOR MULTI-MICROPHONE SYSTEMS

(71) Applicant: Microsoft Technology Licensing, LLC, Redmond, WA (US)

(72) Inventors: Dushyant Sharma, Mountain House, CA (US); Ljubomir Milanovic, Vienna (AT); Philipp Salletmayr, Austria (AT); Rong Gong, Vienna (AT); Patrick A. Naylor, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

This patent is subject to a terminal disclaimer.

(21) Appl. No.: 17/579,806

(22) Filed: Jan. 20, 2022

(65) Prior Publication Data
US 2023/0230582 A1    Jul. 20, 2023

(51) Int. Cl.
*G10L 15/08*    (2006.01)

(52) U.S. Cl.
CPC .................... *G10L 15/08* (2013.01)

(58) Field of Classification Search
None
See application file for complete search history.

(56) References Cited

U.S. PATENT DOCUMENTS

| | | |
|---|---|---|
| 2011/0033063 A1 | 2/2011 | McGrath |
| 2011/0300806 A1* | 12/2011 | Lindahl ............... G10L 21/0208 455/63.1 |
| 2015/0025881 A1 | 1/2015 | Carlos et al. |
| 2016/0064009 A1 | 3/2016 | Every et al. |
| 2017/0094421 A1 | 3/2017 | Giri |
| 2017/0309294 A1 | 10/2017 | Gannot |
| 2018/0240471 A1 | 8/2018 | Markovich Golan |
| 2018/0350381 A1* | 12/2018 | Bryan ..................... G10L 25/84 |
| 2020/0219524 A1 | 7/2020 | Braun |
| 2021/0201931 A1* | 7/2021 | Wang ..................... G10L 21/02 |
| 2021/0233509 A1 | 7/2021 | Lashkari |
| 2021/0329388 A1 | 10/2021 | Zahedi et al. |

(Continued)

OTHER PUBLICATIONS

Schwartz et al., "Multi-microphone speech dereverberation and noise reduction using relative early transfer functions", IEEE ACM Transactions, vol. 23, No. 2 (2015) (Year: 2015).*

(Continued)

*Primary Examiner* — Nicole A K Schmieder
(74) *Attorney, Agent, or Firm* — Foley IP Law, PLLC

(57) ABSTRACT

A method, computer program product, and computing system for obtaining one or more speech signals from a first device, thus defining one or more first device speech signals. One or more speech signals may be obtained from a second device, thus defining one or more second device speech signals. An acoustic relative transfer function may be selected from a plurality of acoustic relative transfer functions based upon, at least in part, the one or more first device speech signals and the one or more second device speech signals. The one or more second device speech signals may be augmented, at run-time, based upon, at least in part, the acoustic relative transfer function.

20 Claims, 13 Drawing Sheets

(56) References Cited

U.S. PATENT DOCUMENTS

2023/0230599 A1\* 7/2023 Sharma .................. G10L 17/04
704/260

OTHER PUBLICATIONS

"International Search Report and Written Opinion Issued in PCT Application No. PCT/US23/060986", Mailed Date: May 2, 2023, 13 Pages.
"International Search Report and Written Opinion Issued in PCT Application No. PCT/US23/060989", Mailed Date: May 2, 2023, 9 Pages.
Brendel, et al., "Manifold Learning-Supported Estimation of Relative Transfer Functions for Spatial Filtering", arXiv:2110.02189v1, Oct. 5, 2021, pp. 8792-8796.
Final Office Action issued in U.S. Appl. No. 17/579,750, mailed on Jan. 10, 2025, 13 Pages.
Non-Final Office Action issued in U.S. Appl. No. 17/579,750, mailed on Jun. 20, 2024, 12 Pages.
Sofer, et al., "Robust Relative Transfer Function Identification on Manifolds for Speech Enhancement", 29th European Signal Processing Conference (EUSIPCO), 2021, pp. 401-405.
Talmon, et al., "Relative transfer function identification on manifolds for supervised GSC beamformers", 21st European Signal Processing Conference (EUSIPCO), 2013, 05 Pages.
Non-Final Office Action mailed on May 23, 2025, in U.S. Appl. No. 17/579,750, 14 pages.

\* cited by examiner

DATA AUGMENTATION SYSTEM AND METHOD FOR MULTI-MICROPHONE SYSTEMS

BACKGROUND

Automated Clinical Documentation (ACD) may be used, e.g., to turn transcribed conversational (e.g., physician, patient, and/or other participants such as patient's family members, nurses, physician assistants, etc.) speech into formatted (e.g., medical) reports. Such reports may be reviewed, e.g., to assure accuracy of the reports by the physician, scribe, etc.

To improve the accuracy of speech processing of ACD, data augmentation may allow for the generation of new training data for a machine learning system by augmenting existing data to represent new conditions. For example, data augmentation has been used to improve robustness to noise and reverberation, and other unpredictable characteristics of speech in a real world deployment (e.g., issues and unpredictable characteristics when capturing speech signals in a real world environment versus a controlled environment).

However, when deployed in multi-microphone system environments, mismatch between the speech signals processed by each microphone system may result in significant performance degradations.

SUMMARY OF DISCLOSURE

In one implementation, a computer-implemented method executed by a computer may include but is not limited to obtaining one or more speech signals from a first device, thus defining one or more first device speech signals. One or more speech signals may be obtained from a second device, thus defining one or more second device speech signals. An acoustic relative transfer function may be selected from a plurality of acoustic relative transfer functions based upon, at least in part, the one or more first device speech signals and the one or more second device speech signals. The one or more second device speech signals may be augmented, at run-time, based upon, at least in part, the acoustic relative transfer function.

One or more of the following features may be included. The one or more first device speech signals may be processed at run-time. The one or more second device speech signals may be processed at run-time. Processing the one or more first device speech signals may include: detecting one or more speech active portions from the one or more first device speech signals; identifying a speaker associated with the one or more speech active portions from the one or more first device speech signals; and applying signal filtering to the one or more speech active portions associated with a predefined signal bandwidth, thus defining one or more first device filtered speech active portions. Processing the one or more second device speech signals may include: detecting one or more speech active portions from the one or more second device speech signals; identifying a speaker associated with the one or more speech active portions from the one or more second device speech signals; and applying signal filtering to the one or more speech active portions associated with a predefined signal bandwidth, thus defining one or more second device filtered speech active portions. Selecting an acoustic relative transfer function from a plurality of acoustic relative transfer functions based upon, at least in part, the one or more first device speech signals and the one or more second device speech signals may include one or more of: estimating the acoustic transfer function based upon, at least in part, the one or more first device speech signals and the one or more second device speech signals; selecting the acoustic transfer function based upon, at least in part, speaker location information associated with at least one of the one or more first device speech signals and the one or more second device speech signals; and selecting the acoustic transfer function based upon, at least in part, a noise component model associated with at least one of the one or more first device speech signals and the one or more second device speech signals. Augmenting, at run-time, the one or more second device speech signals based upon, at least in part, the acoustic relative transfer function may include performing de-noising on the one or more second device speech signals based upon, at least in part, the noise component model. Augmenting, at run-time, the one or more second device speech signals based upon, at least in part, the acoustic relative transfer function may include performing de-reverberation on the one or more second device speech signals based upon, at least in part, the acoustic relative transfer function.

In another implementation, a computer program product resides on a computer readable medium and has a plurality of instructions stored on it. When executed by a processor, the instructions cause the processor to perform operations including but not limited to obtaining one or more speech signals from a first device, thus defining one or more first device speech signals. One or more speech signals may be obtained from a second device, thus defining one or more second device speech signals. An acoustic relative transfer function may be selected from a plurality of acoustic relative transfer functions based upon, at least in part, the one or more first device speech signals and the one or more second device speech signals. The one or more second device speech signals may be augmented, at run-time, based upon, at least in part, the acoustic relative transfer function.

One or more of the following features may be included. The one or more first device speech signals may be processed at run-time. The one or more second device speech signals may be processed at run-time. Processing the one or more first device speech signals may include: detecting one or more speech active portions from the one or more first device speech signals; identifying a speaker associated with the one or more speech active portions from the one or more first device speech signals; and applying signal filtering to the one or more speech active portions associated with a predefined signal bandwidth, thus defining one or more first device filtered speech active portions. Processing the one or more second device speech signals may include: detecting one or more speech active portions from the one or more second device speech signals; identifying a speaker associated with the one or more speech active portions from the one or more second device speech signals; and applying signal filtering to the one or more speech active portions associated with a predefined signal bandwidth, thus defining one or more second device filtered speech active portions. Selecting an acoustic relative transfer function from a plurality of acoustic relative transfer functions based upon, at least in part, the one or more first device speech signals and the one or more second device speech signals may include one or more of: estimating the acoustic transfer function based upon, at least in part, the one or more first device speech signals and the one or more second device speech signals; selecting the acoustic transfer function based upon, at least in part, speaker location information associated with at least one of the one or more first device speech signals and the one or more second device speech signals; and selecting the acoustic transfer function based upon, at least in part, a noise component model associated with at least one of the one or more first device speech signals and the one or more second device speech signals. Augmenting, at run-time, the one or more second device speech signals based upon, at least in part, the acoustic relative transfer function may include performing de-noising on the one or more second device speech signals based upon, at least in part, the noise component model. Augmenting, at run-time, the one or more second device speech signals based upon, at least in part, the acoustic relative transfer function may include performing de-reverberation on the one or more second device speech signals based upon, at least in part, the acoustic relative transfer function.

In another implementation, a computing system includes a processor and memory is configured to perform operations including but not limited to, obtaining one or more speech signals from a first device, thus defining one or more first device speech signals. The processor may be further configured to obtain one or more speech signals from a second device, thus defining one or more second device speech signals. The processor may be further configured to select an acoustic relative transfer function from a plurality of acoustic relative transfer functions based upon, at least in part, the one or more first device speech signals and the one or more second device speech signals. The processor may be further configured to augment, at run-time, the one or more second device speech signals based upon, at least in part, the acoustic relative transfer function.

One or more of the following features may be included. The one or more first device speech signals may be processed at run-time. The one or more second device speech signals may be processed at run-time. Processing the one or more first device speech signals may include: detecting one or more speech active portions from the one or more first device speech signals; identifying a speaker associated with the one or more speech active portions from the one or more first device speech signals; and applying signal filtering to the one or more speech active portions associated with a predefined signal bandwidth, thus defining one or more first device filtered speech active portions. Processing the one or more second device speech signals may include: detecting one or more speech active portions from the one or more second device speech signals; identifying a speaker associated with the one or more speech active portions from the one or more second device speech signals; and applying signal filtering to the one or more speech active portions associated with a predefined signal bandwidth, thus defining one or more second device filtered speech active portions. Selecting an acoustic relative transfer function from a plurality of acoustic relative transfer functions based upon, at least in part, the one or more first device speech signals and the one or more second device speech signals may include one or more of: estimating the acoustic transfer function based upon, at least in part, the one or more first device speech signals and the one or more second device speech signals; selecting the acoustic transfer function based upon, at least in part, speaker location information associated with at least one of the one or more first device speech signals and the one or more second device speech signals; and selecting the acoustic transfer function based upon, at least in part, a noise component model associated with at least one of the one or more first device speech signals and the one or more second device speech signals. Augmenting, at run-time, the one or more second device speech signals based upon, at least in part, the acoustic relative transfer function may include performing de-noising on the one or more second device speech signals based upon, at least in part, the noise component model. Augmenting, at run-time, the one or more second device speech signals based upon, at least in part, the acoustic relative transfer function may include performing de-reverberation on the one or more second device speech signals based upon, at least in part, the acoustic relative transfer function.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
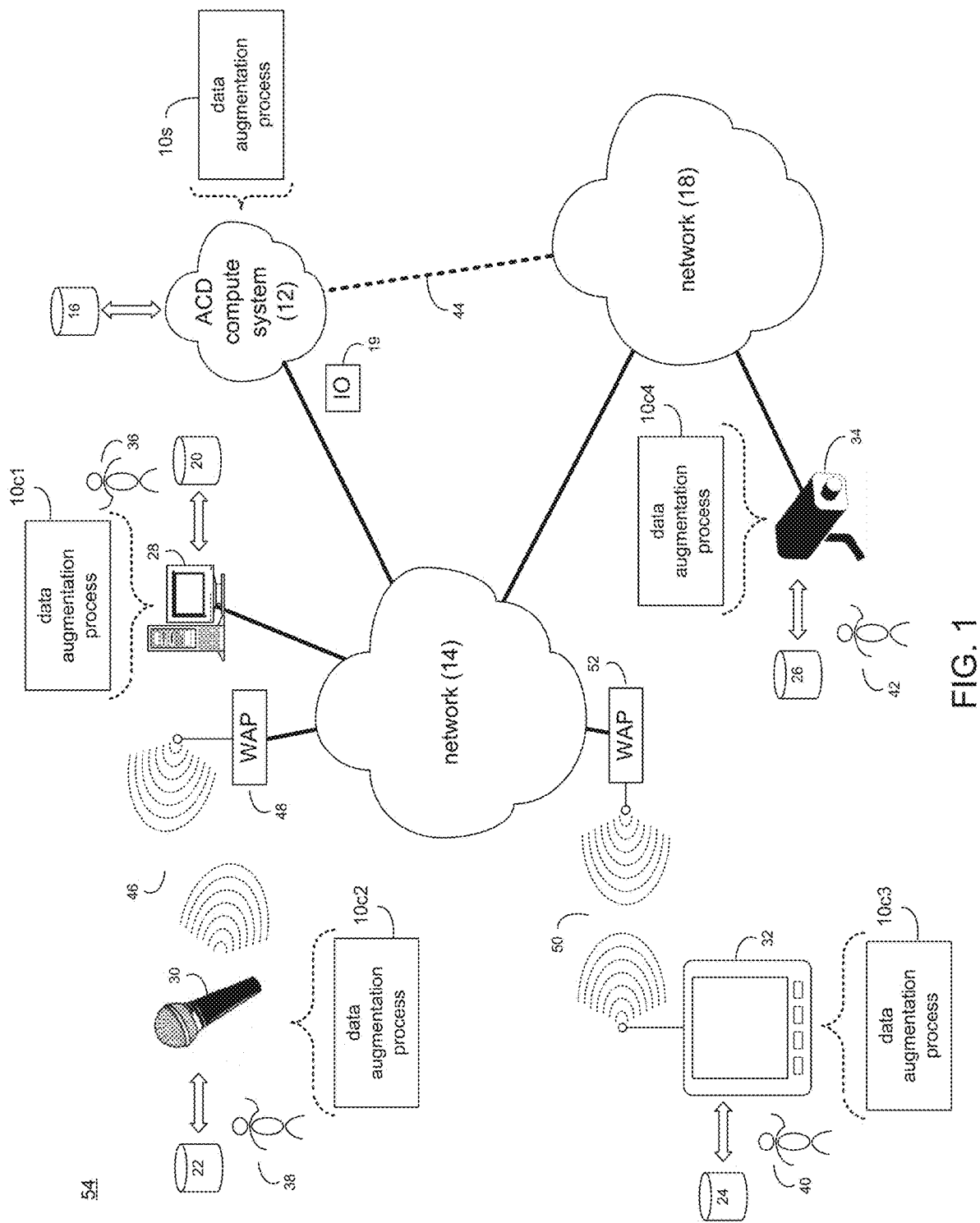
FIG. 1 is a diagrammatic view of an automated clinical documentation computer system and a data augmentation process coupled to a distributed computing network.

Referring to FIG. 1, there is shown data augmentation process 10. As will be discussed below in greater detail, data augmentation process 10 may be configured to automate the collection and processing of clinical encounter information to generate/store/distribute medical records.

Data augmentation process 10 may be implemented as a server-side process, a client-side process, or a hybrid server-side/client-side process. For example, data augmentation process 10 may be implemented as a purely server-side process via data augmentation process 10*s*. Alternatively, data augmentation process 10 may be implemented as a purely client-side process via one or more of data augmentation process 10*c*1, data augmentation process 10*c*2, data augmentation process 10*c*3, and data augmentation process 10*c*4. Alternatively still, data augmentation process 10 may be implemented as a hybrid server-side/client-side process via data augmentation process 10*s* in combination with one or more of data augmentation process 10*c*1, data augmentation process 10*c*2, data augmentation process 10*c*3, and data augmentation process 10*c*4.

Accordingly, data augmentation process 10 as used in this disclosure may include any combination of data augmentation process 10s, data augmentation process 10c1, data augmentation process 10c2, data augmentation process 10c3, and data augmentation process 10c4.

Data augmentation process 10s may be a server application and may reside on and may be executed by automated clinical documentation (ACD) computer system 12, which may be connected to network 14 (e.g., the Internet or a local area network). ACD computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

As is known in the art, a SAN may include one or more of a personal computer, a server computer, a series of server computers, a mini computer, a mainframe computer, a RAID device and a NAS system. The various components of ACD computer system 12 may execute one or more operating systems, examples of which may include but are not limited to: Microsoft Windows Server™; Redhat Linux™, Unix, or a custom operating system, for example.

The instruction sets and subroutines of data augmentation process 10s, which may be stored on storage device 16 coupled to ACD computer system 12, may be executed by one or more processors (not shown) and one or more memory architectures (not shown) included within ACD computer system 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 19) may be sent from data augmentation process 10s, data augmentation process 10c1, data augmentation process 10c2, data augmentation process 10c3 and/or data augmentation process 10c4 to ACD computer system 12. Examples of IO request [20] 19 may include but are not limited to data write requests (i.e. a request that content be written to ACD computer system 12) and data read requests (i.e. a request that content be read from ACD computer system 12).

The instruction sets and subroutines of data augmentation process 10c1, data augmentation process 10c2, data augmentation process 10c3 and/or data augmentation process 10c4, which may be stored on storage devices 20, 22, 24, 26 (respectively) coupled to ACD client electronic devices 28, 30, 32, 34 (respectively), may be executed by one or more processors (not shown) and one or more memory architectures (not shown) incorporated into ACD client electronic devices 28, 30, 32, 34 (respectively). Storage devices 20, 22, 24, 26 may include but are not limited to: hard disk drives; optical drives; RAID devices; random access memories (RAM); read-only memories (ROM), and all forms of flash memory storage devices. Examples of ACD client electronic devices 28, 30, 32, 34 may include, but are not limited to, personal computing device 28 (e.g., a smart phone, a personal digital assistant, a laptop computer, a notebook computer, and a desktop computer), audio input device 30 (e.g., a handheld microphone, a lapel microphone, an embedded microphone (such as those embedded within eyeglasses, smart phones, tablet computers and/or watches) and an audio recording device), display device 32 (e.g., a tablet computer, a computer monitor, and a smart television), machine vision input device 34 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 36, 38, 40, 42 may access ACD computer system 12 directly through network 14 or through secondary network 18. Further, ACD computer system 12 may be connected to network 14 through secondary network 18, as illustrated with link line 44.

The various ACD client electronic devices (e.g., ACD client electronic devices 28, 30, 32, 34) may be directly or indirectly coupled to network 14 (or network 18). For example, personal computing device 28 is shown directly coupled to network 14 via a hardwired network connection. Further, machine vision input device 34 is shown directly coupled to network 18 via a hardwired network connection. Audio input device 30 is shown wirelessly coupled to network 14 via wireless communication channel 46 established between audio input device 30 and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between audio input device 30 and WAP 48. Display device 32 is shown wirelessly coupled to network 14 via wireless communication channel 50 established between display device 32 and WAP 52, which is shown directly coupled to network 14.

The various ACD client electronic devices (e.g., ACD client electronic devices 28, 30, 32, 34) may each execute an operating system, examples of which may include but are not limited to Microsoft Windows™, Apple Macintosh™, Redhat Linux™, or a custom operating system, wherein the combination of the various ACD client electronic devices (e.g., ACD client electronic devices 28, 30, 32, 34) and ACD computer system 12 may form modular ACD system 54.

Figure 2:
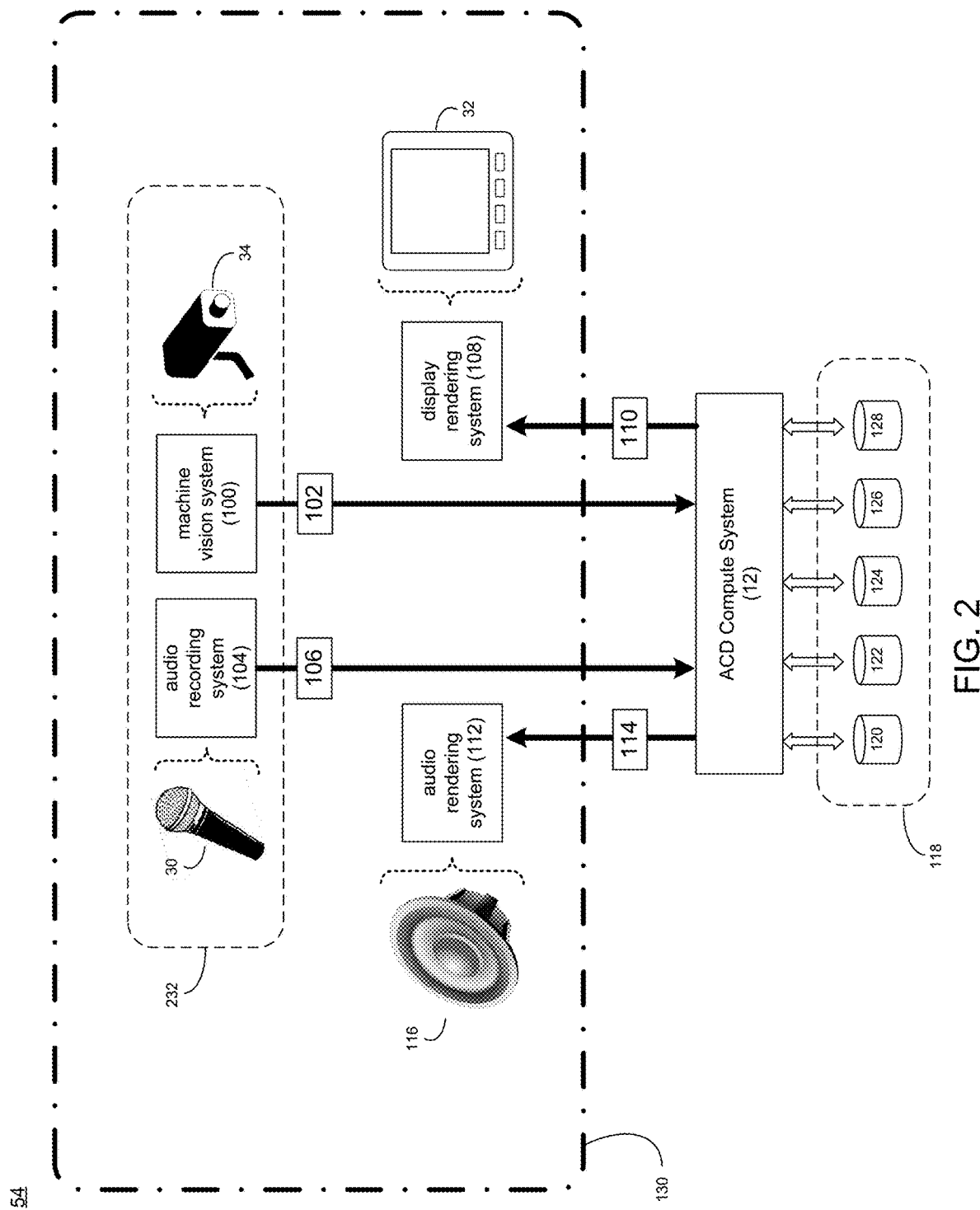
FIGS. 2-4 are diagrammatic views of a modular ACD system according to various implementations of the data augmentation process of FIG. 1.

Referring also to FIG. 2, there is shown a simplified example embodiment of modular ACD system 54 that is configured to automate clinical documentation. Modular ACD system 54 may include: machine vision system 100 configured to obtain machine vision encounter information 102 concerning a patient encounter; audio recording system 104 configured to obtain audio encounter information 106 concerning the patient encounter; and a computer system (e.g., ACD computer system 12) configured to receive machine vision encounter information 102 and audio encounter information 106 from machine vision system 100 and audio recording system 104 (respectively). Modular ACD system 54 may also include: display rendering system 108 configured to render visual information 110; and audio rendering system 112 configured to render audio information 114, wherein ACD computer system 12 may be configured to provide visual information 110 and audio information 114 to display rendering system 108 and audio rendering system 112 (respectively).

Example of machine vision system 100 may include but are not limited to: one or more ACD client electronic devices (e.g., ACD client electronic device 34, examples of which may include but are not limited to an RGB imaging system, an infrared imaging system, a ultraviolet imaging system, a laser imaging system, a SONAR imaging system, a RADAR imaging system, and a thermal imaging system). Examples of audio recording system 104 may include but are not limited to: one or more ACD client electronic devices (e.g., ACD client electronic device 30, examples of which may include but are not limited to a handheld microphone, a lapel microphone, an embedded microphone (such as those embedded within eyeglasses, smart phones, tablet computers and/or watches) and an audio recording device). Examples of display rendering system 108 may include but are not limited to: one or more ACD client electronic devices (e.g., ACD client electronic device 32, examples of which may include but are not limited to a tablet computer, a computer monitor, and a smart television). Examples of audio rendering system 112 may include but are not limited to: one or more ACD client electronic devices (e.g., audio rendering device 116, examples of which may include but are not limited to a speaker system, a headphone system, and an earbud system).

As will be discussed below in greater detail, ACD computer system 12 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource. While in this particular example, five different examples of datasources 118, are shown, this is for illustrative purposes only and is not intended to be a limitation of this disclosure, as other configurations are possible and are considered to be within the scope of this disclosure.

As will be discussed below in greater detail, modular ACD system 54 may be configured to monitor a monitored space (e.g., monitored space 130) in a clinical environment, wherein examples of this clinical environment may include but are not limited to: a doctor's office, a medical facility, a medical practice, a medical lab, an urgent care facility, a medical clinic, an emergency room, an operating room, a hospital, a long term care facility, a rehabilitation facility, a nursing home, and a hospice facility. Accordingly, an example of the above-referenced patient encounter may include but is not limited to a patient visiting one or more of the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility).

Machine vision system 100 may include a plurality of discrete machine vision systems when the above-described clinical environment is larger or a higher level of resolution is desired. As discussed above, examples of machine vision system 100 may include but are not limited to: one or more ACD client electronic devices (e.g., ACD client electronic device 34, examples of which may include but are not limited to an RGB imaging system, an infrared imaging system, an ultraviolet imaging system, a laser imaging system, a SONAR imaging system, a RADAR imaging system, and a thermal imaging system). Accordingly, machine vision system 100 may include one or more of each of an RGB imaging system, an infrared imaging systems, an ultraviolet imaging systems, a laser imaging system, a SONAR imaging system, a RADAR imaging system, and a thermal imaging system.

Audio recording system 104 may include a plurality of discrete audio recording systems when the above-described clinical environment is larger or a higher level of resolution is desired. As discussed above, examples of audio recording system 104 may include but are not limited to: one or more ACD client electronic devices (e.g., ACD client electronic device 30, examples of which may include but are not limited to a handheld microphone, a lapel microphone, an embedded microphone (such as those embedded within eyeglasses, smart phones, tablet computers and/or watches) and an audio recording device). Accordingly, audio recording system 104 may include one or more of each of a handheld microphone, a lapel microphone, an embedded microphone (such as those embedded within eyeglasses, smart phones, tablet computers and/or watches) and an audio recording device.

Display rendering system 108 may include a plurality of discrete display rendering systems when the above-described clinical environment is larger or a higher level of resolution is desired. As discussed above, examples of display rendering system 108 may include but are not limited to: one or more ACD client electronic devices (e.g., ACD client electronic device 32, examples of which may include but are not limited to a tablet computer, a computer monitor, and a smart television). Accordingly, display rendering system 108 may include one or more of each of a tablet computer, a computer monitor, and a smart television.

Audio rendering system 112 may include a plurality of discrete audio rendering systems when the above-described clinical environment is larger or a higher level of resolution is desired. As discussed above, examples of audio rendering system 112 may include but are not limited to: one or more ACD client electronic devices (e.g., audio rendering device 116, examples of which may include but are not limited to a speaker system, a headphone system, or an earbud system). Accordingly, audio rendering system 112 may include one or more of each of a speaker system, a headphone system, or an earbud system.

ACD computer system 12 may include a plurality of discrete computer systems. As discussed above, ACD computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform. Accordingly, ACD computer system 12 may include one or more of each of a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

Figure 3:
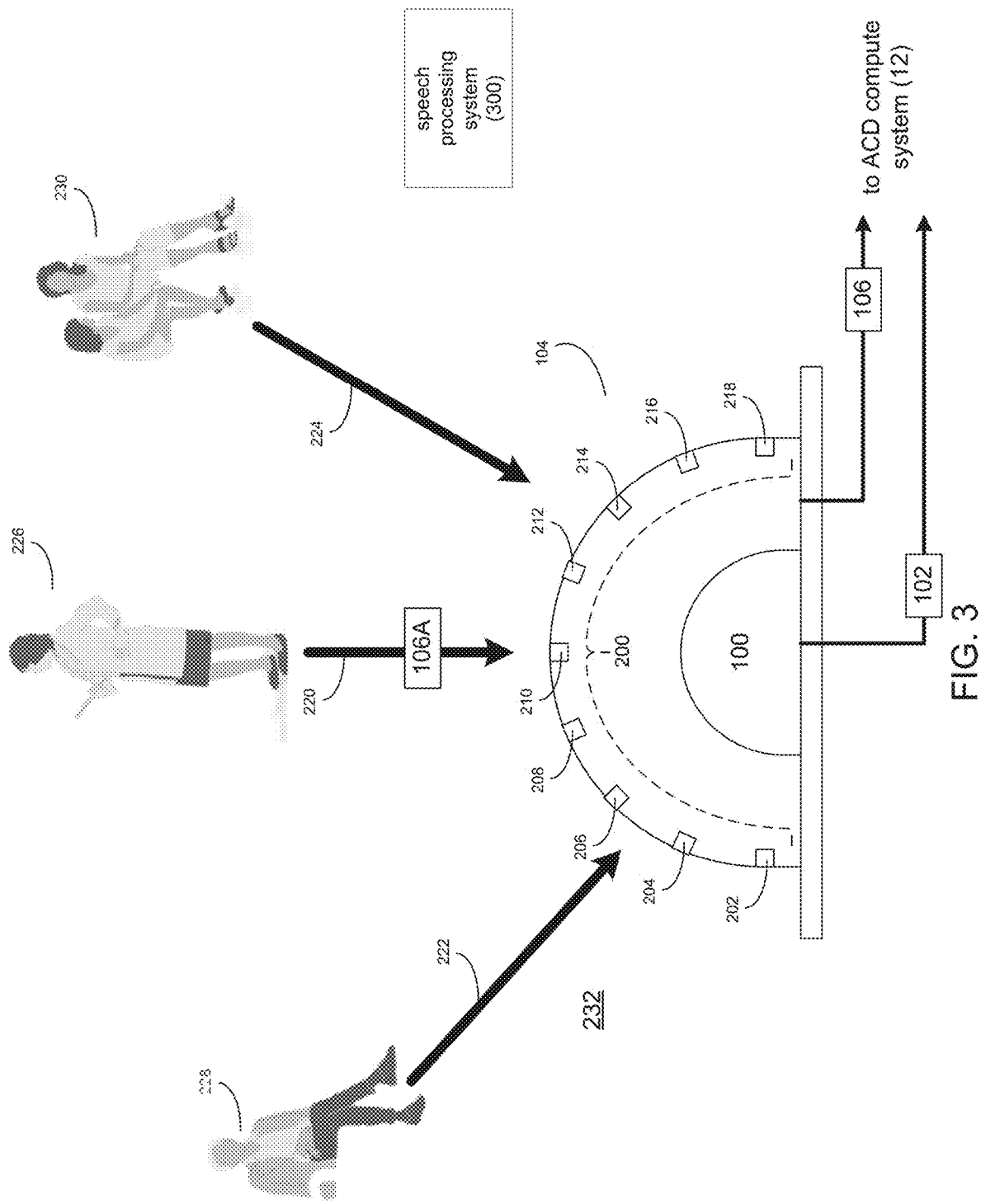

Referring also to FIG. 3, audio recording system 104 may include directional microphone array 200 having a plurality of discrete microphone assemblies. For example, audio recording system 104 may include a plurality of discrete audio acquisition devices (e.g., audio acquisition devices 202, 204, 206, 208, 210, 212, 214, 216, 218) that may form microphone array 200. As will be discussed below in greater detail, modular ACD system 54 may be configured to form one or more audio recording beams (e.g., audio recording beams 220, 222, 224) via the discrete audio acquisition devices (e.g., audio acquisition devices 202, 204, 206, 208, 210, 212, 214, 216, 218) included within audio recording system 104.

For example, modular ACD system 54 may be further configured to steer the one or more audio recording beams (e.g., audio recording beams 220, 222, 224) toward one or more encounter participants (e.g., encounter participants 226, 228, 230) of the above-described patient encounter. Examples of the encounter participants (e.g., encounter participants 226, 228, 230) may include but are not limited to: medical professionals (e.g., doctors, nurses, physician's assistants, lab technicians, physical therapists, scribes (e.g., a transcriptionist) and/or staff members involved in the patient encounter), patients (e.g., people that are visiting the above-described clinical environments for the patient encounter), and third parties (e.g., friends of the patient, relatives of the patient and/or acquaintances of the patient that are involved in the patient encounter).

Accordingly, modular ACD system 54 and/or audio recording system 104 may be configured to utilize one or more of the discrete audio acquisition devices (e.g., audio acquisition devices 202, 204, 206, 208, 210, 212, 214, 216, 218) to form an audio recording beam. For example, modular ACD system 54 and/or audio recording system 104 may be configured to utilize audio acquisition device 210 to form audio recording beam 220, thus enabling the capturing of audio (e.g., speech) produced by encounter participant 226 (as audio acquisition device 210 is pointed to (i.e., directed toward) encounter participant 226). Additionally, modular ACD system 54 and/or audio recording system 104 may be configured to utilize audio acquisition devices 204, 206 to form audio recording beam 222, thus enabling the capturing of audio (e.g., speech) produced by encounter participant 228 (as audio acquisition devices 204, 206 are pointed to (i.e., directed toward) encounter participant 228). Additionally, modular ACD system 54 and/or audio recording system 104 may be configured to utilize audio acquisition devices 212, 214 to form audio recording beam 224, thus enabling the capturing of audio (e.g., speech) produced by encounter participant 230 (as audio acquisition devices 212, 214 are pointed to (i.e., directed toward) encounter participant 230). Further, modular ACD system 54 and/or audio recording system 104 may be configured to utilize null-steering precoding to cancel interference between speakers and/or noise.

As is known in the art, null-steering precoding is a method of spatial signal processing by which a multiple antenna transmitter may null multiuser interference signals in wireless communications, wherein null-steering precoding may mitigate the impact off background noise and unknown user interference.

In particular, null-steering precoding may be a method of beamforming for narrowband signals that may compensate for delays of receiving signals from a specific source at different elements of an antenna array. In general and to improve performance of the antenna array, in incoming signals may be summed and averaged, wherein certain signals may be weighted and compensation may be made for signal delays.

Machine vision system 100 and audio recording system 104 may be stand-alone devices (as shown in FIG. 2). Additionally/alternatively, machine vision system 100 and audio recording system 104 may be combined into one package to form mixed-media ACD device 232. For example, mixed-media ACD device 232 may be configured to be mounted to a structure (e.g., a wall, a ceiling, a beam, a column) within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility), thus allowing for easy installation of the same. Further, modular ACD system 54 may be configured to include a plurality of mixed-media ACD devices (e.g., mixed-media ACD device 232) when the above-described clinical environment is larger or a higher level of resolution is desired.

Modular ACD system 54 may be further configured to steer the one or more audio recording beams (e.g., audio recording beams 220, 222, 224) toward one or more encounter participants (e.g., encounter participants 226, 228, 230) of the patient encounter based, at least in part, upon machine vision encounter information 102. As discussed above, mixed-media ACD device 232 (and machine vision system 100/audio recording system 104 included therein) may be configured to monitor one or more encounter participants (e.g., encounter participants 226, 228, 230) of a patient encounter.

Specifically, machine vision system 100 (either as a stand-alone system or as a component of mixed-media ACD device 232) may be configured to detect humanoid shapes within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility). And when these humanoid shapes are detected by machine vision system 100, modular ACD system 54 and/or audio recording system 104 may be configured to utilize one or more of the discrete audio acquisition devices (e.g., audio acquisition devices 202, 204, 206, 208, 210, 212, 214, 216, 218) to form an audio recording beam (e.g., audio recording beams 220, 222, 224) that is directed toward each of the detected humanoid shapes (e.g., encounter participants 226, 228, 230).

As discussed above, ACD computer system 12 may be configured to receive machine vision encounter information 102 and audio encounter information 106 from machine vision system 100 and audio recording system 104 (respectively); and may be configured to provide visual information 110 and audio information 114 to display rendering system 108 and audio rendering system 112 (respectively). Depending upon the manner in which modular ACD system 54 (and/or mixed-media ACD device 232) is configured, ACD computer system 12 may be included within mixed-media ACD device 232 or external to mixed-media ACD device 232.

As discussed above, ACD computer system 12 may execute all or a portion of data augmentation process 10, wherein the instruction sets and subroutines of data augmentation process 10 (which may be stored on one or more of e.g., storage devices 16, 20, 22, 24, 26) may be executed by ACD computer system 12 and/or one or more of ACD client electronic devices 28, 30, 32, 34.

The Data Augmentation Process:

In some implementations consistent with the present disclosure, systems and methods may be provided for data augmentation for speech processing systems using acoustic transfer function and/or noise component model estimation between various microphone systems. For example and as discussed above, data augmentation allows for the generation of new training data for a machine learning system by augmenting existing data to represent new conditions. Data augmentation has been used to improve robustness to noise and reverberation, and other unpredictable characteristics of speech in a real world deployment (e.g., issues and unpredictable characteristics when capturing speech signals in a real world environment versus a controlled environment).

Figure 4:
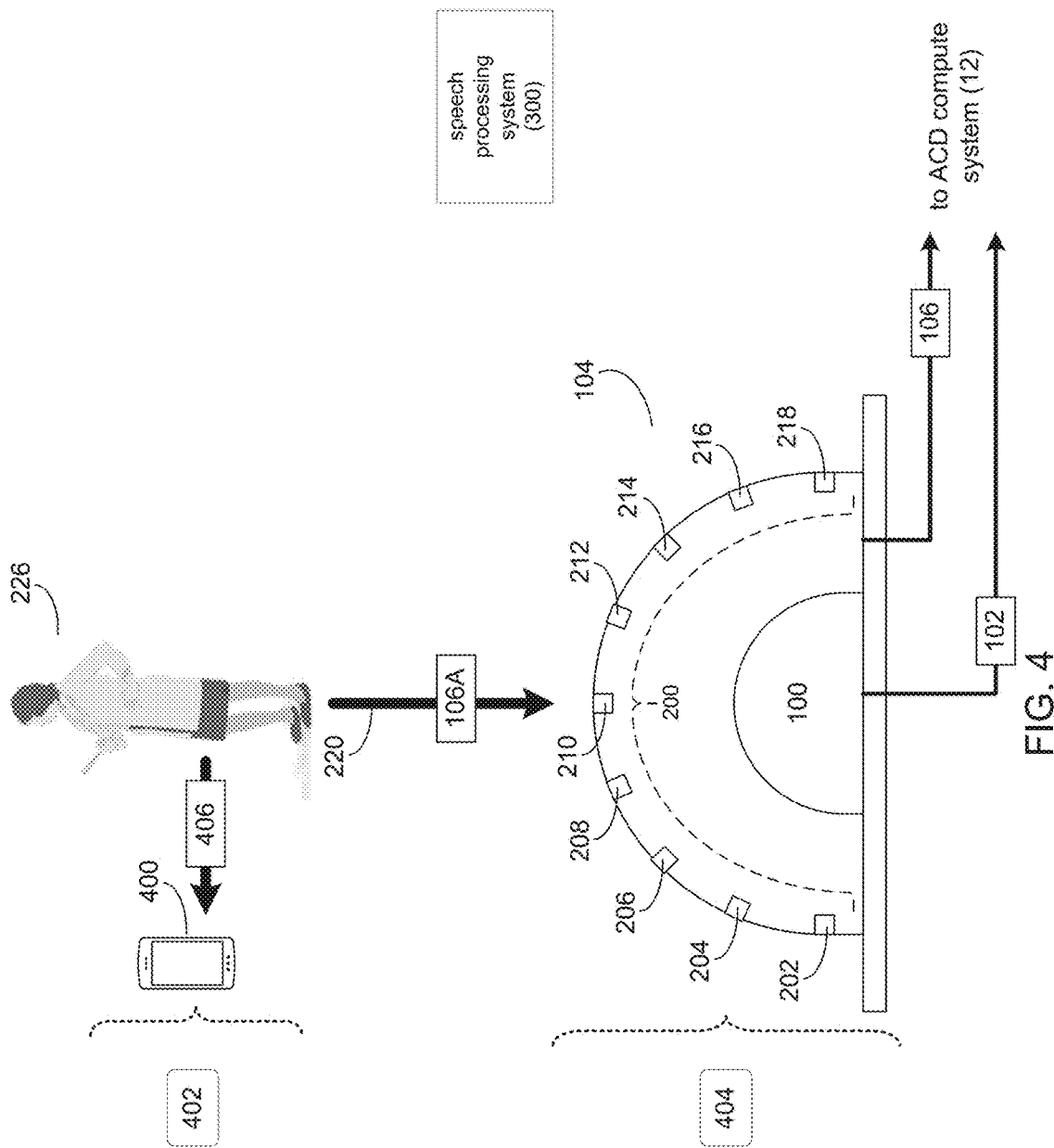

However, when deployed in multi-microphone system environments, mismatch between the speech signals processed by each microphone system may result in significant performance degradations. For example, suppose a large amount of data is collected for e.g., microphone device A and that it is desirable to deploy a speech processing system using a new microphone/microphone array, e.g., microphone device B. Device A and device B may be significantly different. Referring also to FIG. 4, suppose that device A is a handheld electronic device (e.g., handheld electronic device 400) and that device B is an audio recording system (e.g., audio recording system 104) of a mixed-media ACD device (e.g., mixed-media ACD device 232) deployed in a monitored environment. Suppose that the handheld electronic device 400 is deployed in a doctor's shirt pocket, which may be referred to as a near field microphone system (NFMS). Further suppose that it would be desirable to deploy a new microphone device that captures audio from a greater distance to the participants (i.e., a microphone array mounted on a wall), which may be referred to as a far field microphone system (FFMS). With both microphone systems, there may be data mismatch between the NFMS and FFMS datasets. Now suppose that there are large quantities of NFMS data but limited FFMS data. Accordingly, the training of speech processing systems may be restricted due to the lack of FFMS data. In this manner, mismatch between the two datasets relating to the level and characteristics of reverberation and background noise in the signals may lead to significant performance degradations in speech processing systems.

As will be discussed in greater detail below, implementations of the present disclosure may allow for the generation of augmented data from the data of one device or acoustic domain based upon the reverberation and/or noise characteristics of another device or acoustic domain. For example, implementations of the present disclosure may allow reverberation and noise components collected from development data to be applied (e.g., via denoising, dereverberation, adding noise, and/or adding reverberation) in a targeted way at run time to the data of one device/acoustic domain (e.g., FFMS data) to make it acoustically similar to the data of another device/acoustic domain (e.g., NFMS data) on which a speech processing system may be trained. Additionally, the present disclosure may allow for reverberation and noise components to be applied to training data of one device/acoustic domain (e.g., NFMS training data) to make it closer to the another device/acoustic domain (e.g., FFMS data). As such, the augmented training data may be used for e.g., training a speech processing system to process e.g., FFMS data. Such data augmentation may be based on information captured from the field and may represent a mapping from one acoustic domain to another.

Figure 5:
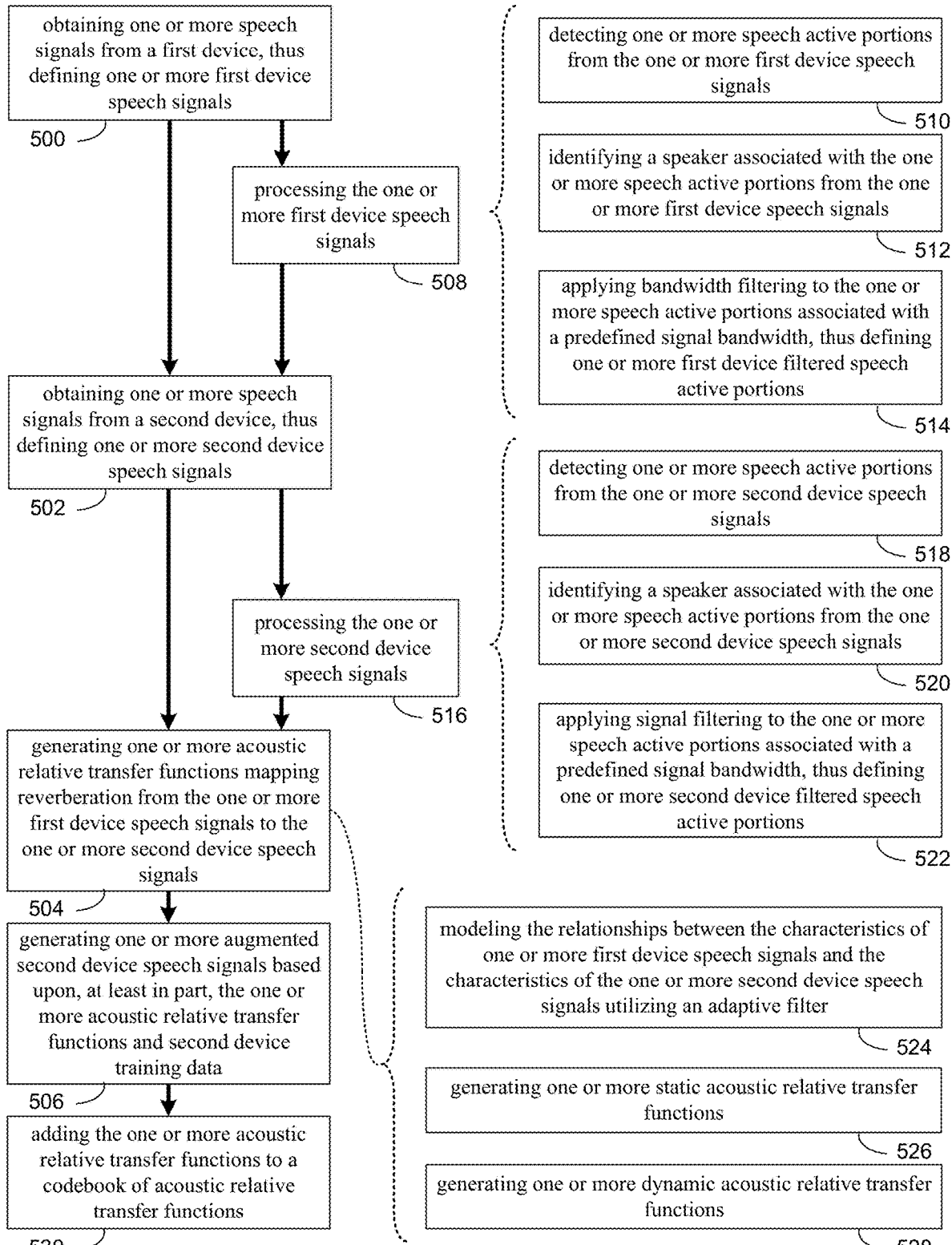
FIG. 5 is a flow chart of one implementation of the data augmentation process of FIG. 1.
Figure 6:
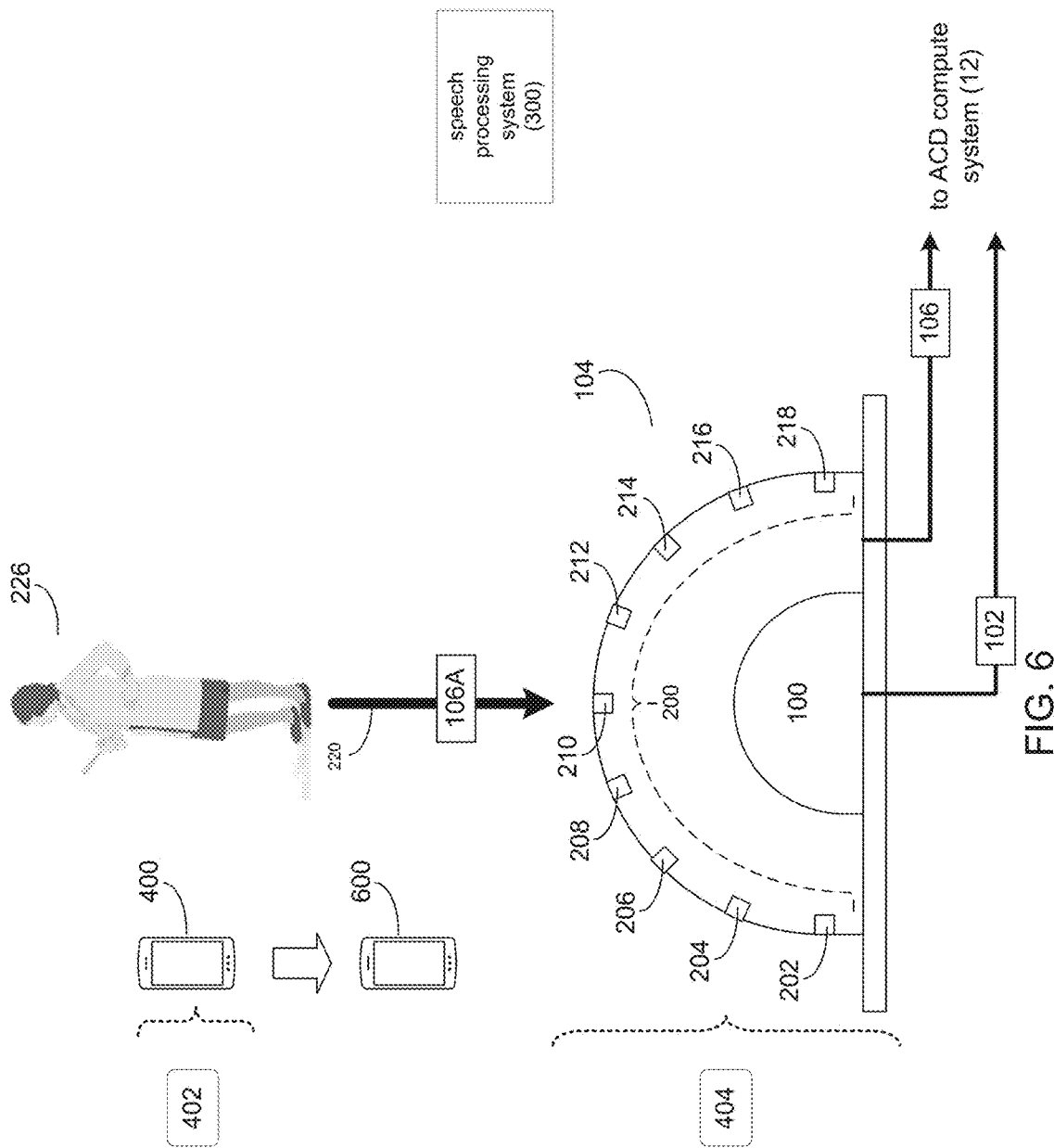
FIGS. 6-7 are diagrammatic views of a modular ACD system according to various implementations of the data augmentation process of FIG. 1.

As discussed above and referring also at least to FIGS. 5-7, data augmentation process 10 may obtain 500 one or more speech signals from a first device, thus defining one or more first device speech signals. One or more speech signals may be obtained 502 from a second device, thus defining one or more second device speech signals. One or more acoustic relative transfer functions mapping reverberation from the one or more first device speech signals to the one or more second device speech signals may be generated 504. One or more augmented second device speech signals may be generated 506 based upon, at least in part, the one or more acoustic relative transfer functions and first device training data.

Referring again to FIG. 4 and in some implementations, multiple microphone devices may be deployed in a monitored environment. For example, a first device (e.g., handheld electronic device 400) may be placed adjacent to a speaker (e.g., participant 226) and a second device (e.g., audio recording system 104) may deployed on a wall further away from the speaker (e.g., participant 226). The audio recording system 104 may include directional microphone array 200 having a plurality of discrete microphone assemblies. For example, audio recording system 104 may include a plurality of discrete audio acquisition devices (e.g., audio acquisition devices 202, 204, 206, 208, 210, 212, 214, 216, 218) that may form microphone array 200.

In this example, data augmentation process 10 may generate augmented data for the second device (e.g., audio recording system 104) based upon, at least in part, various signal characteristics associated with the first device (e.g., handheld electronic device 400). However, it will be appreciated that the designation of audio recording system 104 as the second device is for example purposes only as audio recording system 104 may be the first device and handheld electronic device 400 may be the second device such that data augmentation process 10 may generate augmented data for the second device (e.g., handheld electronic device 400) based upon, at least in part, various signal characteristics associated with the first device (e.g., audio recording system 104).

While the first device (e.g., handheld electronic device 400) and the second device (e.g., audio recording system 104) are described above as different types of microphone systems, it will be appreciated that this is for example purposes only. For example and referring also to FIG. 6, suppose the first device is a handheld electronic device (e.g., handheld electronic device 400) with various signal processing characteristics (e.g., based on the construction of the microphone components) that may generate speech signals with particular characteristics. In this example, the first device (e.g., handheld electronic device 400) may represent a device that is to be replaced by a new or different version of the first device (e.g., handheld electronic device 600). Handheld electronic device 600 may be the second device such that data augmentation process 10 may generate augmented data for the second device (e.g., handheld electronic device 600) based upon, at least in part, various signal characteristics associated with the first device (e.g., handheld electronic device 400).

As will be discussed in greater detail below, data augmentation process 10 may map reverberation characteristics from speech signals obtained from one device (e.g., a first device) to speech signals of another device (e.g., a second device) deployed in the same monitored environment. With the mapping of reverberation characteristics from the first device speech signals to the second device speech signals, data augmentation process 10 may generate augmented speech signals for a second device that include and/or account for the reverberation characteristics of the first device. While reverberation characteristics have been discussed, it will be appreciated that data augmentation process 10 may generate augmented second device speech signals that map any acoustic characteristic(s) from a first device/acoustic domain to a second device/acoustic domain.

In some implementations, data augmentation process 10 may obtain 500 one or more speech signals from a first device, thus defining one or more first device speech signals. For example, suppose that the first device is e.g., handheld electronic device 400. In this example, as the first device (e.g., handheld electronic device 400) is near or adjacent to the speaker (e.g., participant 226), the first device (e.g., handheld electronic device 400) may be considered a near field microphone system (NFMS). Accordingly, data augmentation process 10 may obtain 500 one or more speech signals from the first device (e.g., handheld electronic device 400). As discussed above, the first device (e.g., handheld electronic device 400) may include a microphone component or various components configured to capture and record speech signals from one or more speakers (e.g., participant 226). As shown in FIG. 4, data augmentation process 10 may obtain 500 one or more speech signals (e.g., speech signal 402). Speech signal 402 may represent at least a portion of audio encounter information 406 received by handheld electronic device 400 from participant 226. Data augmentation process 10 may obtain 500 and store speech signal 402 as a first device speech signal/first device speech signal recording. As will be discussed in greater detail below, the one or more speech signals (e.g., speech signal 402) may include various signal characteristics associated with the monitored environment (e.g., reverberation characteristics, noise characteristics, etc.) as obtained 500 by the first device (e.g., handheld electronic device 400).

Obtaining 500 one or more speech signals from the first device may include generating and/or receiving simulated speech signals associated with the first device. For example, data augmentation process 10 may generate and/or receive one or more simulated speech signals that are designed to represent speech signals captured by a first device. Continuing with the above example, suppose that the first device is e.g., handheld electronic device 400. Accordingly, data augmentation process 10 may generate and/or receive one or more simulated speech signals (e.g., speech signal 402). Data augmentation process 10 may obtain 500 both measured speech signals and simulated speech signals to enrich the amount of first device speech data available.

In some implementations, data augmentation process 10 may obtain 502 one or more speech signals from a second device, thus defining one or more second device speech signals. For example, suppose that the second device is e.g., audio recording system 104. In this example, as the second device (e.g., audio recording system 104) is far from or not adjacent to the speaker (e.g., participant 226), the second device (e.g., audio recording system 104) may be considered a far field microphone system (FFMS). Accordingly, data augmentation process 10 may obtain 502 one or more speech signals from the second device (e.g., audio recording system 104). As discussed above, the second device (e.g., audio recording system 104) may include a plurality of discrete audio acquisition devices (e.g., audio acquisition devices 202, 204, 206, 208, 210, 212, 214, 216, 218) that may form microphone array 200 configured to capture and record speech signals from one or more speakers (e.g., participant 226).

As shown in FIG. 4, data augmentation process 10 may obtain 502 one or more speech signals (e.g., speech signal 404). Speech signal 404 may represent at least a portion of audio encounter information 106A received by audio recording system 104 from participant 226. Data augmentation process 10 may obtain 502 and store speech signal 404 as a second device speech signal/second device speech signal recording. As will be discussed in greater detail below, the one or more speech signals (e.g., speech signal 404) may include various signal characteristics associated with the monitored space (e.g., reverberation characteristics, noise characteristics, etc.) as obtained 502 by the second device (e.g., audio recording system 104).

Obtaining 502 one or more speech signals from the second device may include generating and/or receiving simulated speech signals associated with the second device. For example, data augmentation process 10 may generate and/or receive one or more simulated speech signals that are designed to represent speech signals captured by the second device. Continuing with the above example, suppose that the second device is e.g., audio recording system 104. Accordingly, data augmentation process 10 may generate and/or receive one or more simulated speech signals (e.g., speech signal 404). Data augmentation process 10 may obtain 502 both measured speech signals and simulated speech signals to enrich the amount of second device speech data available.

Figure 7:
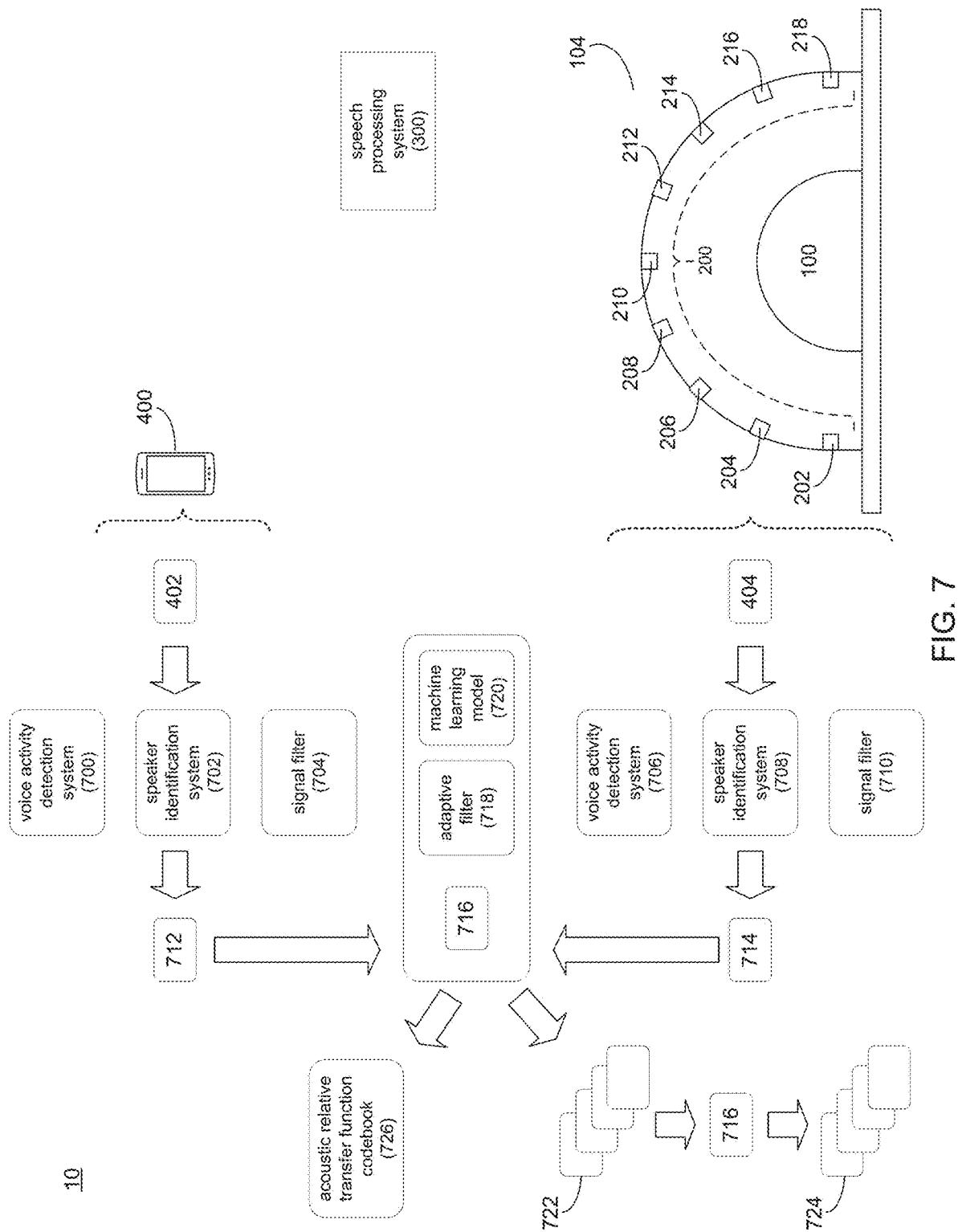

Data augmentation process 10 may process 508 the one or more first device speech signals. For example and as discussed above, the one or more first device speech signals (e.g., first device speech signal 402) may be obtained 500 by the first device (e.g., handheld electronic device 400) and stored (e.g., within one or more datasources (e.g., datasources 118)). Processing 508 the one or more first device speech signals may include detecting 510 one or more speech active portions from the one or more first device speech signals. For example, the one or more first device speech signals (e.g., first device speech signal 402) may include portions with speech activity and/or portions without speech activity. Referring also to FIG. 7, data augmentation process 10 may detect 510, using a voice activity detector system (e.g., voice activity detection system 700), one or more speech active portions of first device speech signal 402. As is known in the art, a voice activity detection system (e.g., voice activity detection system 700) may include various algorithms configured to perform noise reduction on a signal and classify various portions of the signal as speech active or speech inactive.

Data augmentation process 10 may mark or otherwise indicate which portions of the one or more first device speech signals (e.g., first device speech signal 402) are speech active and/or which portions of the one or more first device speech signals (e.g., first device speech signal 402) are speech inactive. For example, data augmentation process 10 may generate metadata that identifies portions of first device speech signal 402 that includes speech activity. In one example, data augmentation process 10 may generate acoustic metadata with timestamps indicating portions of first device speech signal 402 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 700 may utilize user input to classify particular portions of the signal as speech or non-speech. As will be discussed in greater detail below, data augmentation process 10 may utilize the one or more speech active portions and/or the one or more speech inactive portions for generating augmented data. For example, data augmentation process 10 may utilize the one or more speech active portions to generate one or more acoustic relative transfer functions that map reverberation components from first device speech signals to second device speech signals. Additionally, data augmentation process 10 may utilize the one or more speech inactive portions for generating one or more noise component models configured to represent the spectral signature of noise components from first device speech signals (e.g., first device speech signal 402).

Processing 508 the one or more first device speech signals may include identifying 512 a speaker associated with the one or more speech active portions from the one or more first device speech signals. For example, data augmentation process 10 may process 508 the one or more first device speech signals (e.g., first device speech signal 402) to identify 512 a speaker associated with the one or more speech active portions. Data augmentation process 10 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource.

In some implementations, data augmentation process 10 may compare the data included within the user profile (defined within the user profile datasource) to at least a portion of the speech active portions from the one or more first device speech signals using a speaker identification system (e.g., speaker identification system 702). The data included within the user profile may include voice-related data (e.g., a voice print that is defined locally within the user profile or remotely within the voice print datasource), language use patterns, user accent identifiers, user-defined macros, and user-defined shortcuts, for example. Specifically and when attempting to associate at least a portion of the speech active portions from the one or more first device speech signals with at least one known encounter participant, data augmentation process 10 may compare one or more voice prints (defined within the voice print datasource) to one or more voices defined within the speech active portions from the one or more first device speech signals. As is known in the art, a speaker identification system (e.g., speaker identification system 702) may generally include various algorithms for comparing speech signals to voice prints to identify particular known speakers.

As discussed above and for this example, assume that encounter participant 226 is a medical professional that has a voice print/profile. Accordingly and for this example, data augmentation process 10 may identify 512 encounter participant 226 when comparing the one or more speech active portions of first device speech signal 402 to the various voice prints/profiles included within the voice print datasource using speaker identification system 702. Accordingly and when processing 508 the first device speech signal, data augmentation process 10 may associate the one or more speech active portions with the voice print/profile of Doctor Susan Jones and may identify encounter participant 226 as "Doctor Susan Jones". While an example of identifying a single speaker has been discussed, it will be appreciated that this is for example purposes only and that data augmentation process 10 may identify 512 any number of speakers from the one or more speech active portions of the first device speech signal within the scope of the present disclosure. Data augmentation process 10 may store the one or more speaker identities as metadata (e.g., within a datasource (e.g., datasource 118)). In some implementations, data augmentation process 10 may utilize the speaker identity to correlate speech portions from first device speech signals with a speaker in second device speech signals.

Processing 508 the one or more first device speech signals may include applying 514 signal filtering to the one or more speech active portions associated with a predefined signal bandwidth, thus defining one or more first device filtered speech active portions. For example, speech components of a speech signal may be generally limited to particular frequencies of interest. Additionally, various speech processing systems may utilize various frequency ranges when processing speech. Accordingly, data augmentation process 10 may utilize one or more signal filters (e.g., signal filter 704) to filter the one or more speech active portions to a predefined signal bandwidth, thus defining one or more first device filtered speech active portions. In one example, signal filter 704 may be a band-pass filter. However, it will be appreciated that various filters may be utilized to filter the one or more speech active portions to a predefined signal bandwidth within the scope of the present disclosure.

For example, suppose an automated speech recognition (ASR) system (e.g., speech processing system 300) is configured to process speech signals in the frequency band between e.g., 300 Hz and 7000 Hz. Accordingly, data augmentation process 10 may apply 514 signal filtering, using the signal filter (e.g., signal filter 704), to define one or more first device filtered speech active portions with a predefined signal bandwidth between e.g., 300 Hz and 7000 Hz. While an example predefined signal bandwidth of e.g., 300 Hz-7000 Hz has been described for one speech processing system, it will be appreciated that any predefined signal bandwidth for any type of speech processing system may be utilized within the scope of the present disclosure. For example, the predefined signal bandwidth may be a default range, a user-defined range, and/or may be automatically defined by data augmentation process 10.

Data augmentation process 10 may process 516 the one or more second device speech signals. For example and as discussed above, the one or more second device speech signals (e.g., speech signal 404) may be obtained 502 by the second device (e.g., audio recording system 104) and stored (e.g., within one or more datasources (e.g., datasources 118)). Processing 516 the one or more second device speech signals may include detecting 518 one or more speech active portions from the one or more second device speech signals. For example, the one or more second device speech signals (e.g., second device speech signal 404) may include portions with speech activity and/or portions without speech activity. Referring again to FIG. 7, data augmentation process 10 may detect 518, using a voice activity detector system (e.g., voice activity detection system 706), one or more speech active portions of second device speech signal 404. As is known in the art, voice activity detection system 706 may include various algorithms configured to perform noise reduction on a signal and classify various portions of the signal as speech active or speech inactive. Data augmentation process 10 may mark or otherwise indicate which portions of the one or more second device speech signals (e.g., second device speech signal 404) are speech active and/or which portions of the one or more second device speech signals (e.g., second device speech signal 404) are speech inactive. Voice activity detection system 706 may be the same as voice activity detection system 700 and/or may include unique algorithms for detecting speech active portions within the second device speech signals (e.g., second device speech signal 404).

For example, data augmentation process 10 may generate metadata that identifies portions of second device speech signal 402 that includes speech activity. In one example, data augmentation process 10 may generate metadata with timestamps indicating portions of second device speech signal 404 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 706 may include user input to classify particular portions of the signal as speech or non-speech. As will be discussed in greater detail below, data augmentation process 10 may utilize either the one or more speech active portions or one or more speech inactive portions for generating augmented data. For example, data augmentation process 10 may utilize the one or more speech active portions to generate one or more acoustic relative transfer functions that map reverberation components from the second device speech signals to the second device speech signals. Additionally, data augmentation process 10 may utilize the one or more speech inactive portions for generating one or more noise component models configured to represent the spectral signature of noise components from the one or more second device speech signals (e.g., second device speech signal 404).

Processing 516 the one or more second device speech signals may include identifying 520 a speaker associated with the one or more speech active portions from the one or more second device speech signals. For example, data augmentation process 10 may data augmentation process 10 the one or more second device speech signals (e.g., second device speech signal 404) to identify 520 a speaker associated with the one or more speech active portions. Data augmentation process 10 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource.

In some implementations, data augmentation process 10 may compare the data included within the user profile (defined within the user profile datasource) to at least a portion of the speech active portions from the one or more second device speech signals using a speaker identification system (e.g., speaker identification system 708). The data included within the user profile may include voice-related data (e.g., a voice print that is defined locally within the user profile or remotely within the voice print datasource), language use patterns, user accent identifiers, user-defined macros, and user-defined shortcuts, for example. Specifically and when attempting to associate at least a portion of the speech active portions from the one or more second device speech signals with at least one known encounter participant, data augmentation process 10 may compare one or more voice prints (defined within the voice print datasource) to one or more voices defined within the speech active portions from the one or more second device speech signals. As is known in the art, a speaker identification system (e.g., speaker identification system 708) may generally include various algorithms for comparing speech signals to voice prints to identify particular known speakers. Speaker identification system 708 may be the same as speaker identification system 702 and/or may include unique algorithms for detecting speech active portions within the second device speech signals (e.g., second device speech signal 404).

As discussed above and for this example, assume that encounter participant 226 is a medical professional that has a voice print/profile. Accordingly and for this example, data augmentation process 10 may identify 520 encounter participant 226 when comparing the one or more speech active portions of second device speech signal 402 to the various voice prints/profiles included within the voice print datasource using speaker identification system 702. Accordingly and when processing 516 the second device speech signal, data augmentation process 10 may associate the one or more speech active portions with the voice print/profile of Doctor Susan Jones and may identify encounter participant 226 as "Doctor Susan Jones". While an example of identifying a single speaker has been discussed, it will be appreciated that this is for example purposes only and that data augmentation process 10 may identify 520 any number of speakers from the one or more speech active portions of the second device speech signal within the scope of the present disclosure. Data augmentation process 10 may store the one or more speaker identities as metadata (e.g., within a datasource (e.g., datasource 118)).

Processing 516 the one or more second device speech signals may include applying 522 signal filtering to the one or more speech active portions associated with a predefined signal bandwidth, thus defining one or more second device filtered speech active portions. For example, speech components of a speech signal may be generally limited to particular frequencies of interest. Additionally, various speech processing systems may utilize various frequency ranges when processing speech. Accordingly, data augmentation process 10 may utilize one or more signal filters (e.g., signal filter 710) to filter the one or more speech active portions to a predefined signal bandwidth, thus defining one or more second device filtered speech active portions. In one example, data augmentation process 10 may utilize bandpass filter(s) for signal filter 710. However, it will be appreciated that various filters may be utilized to filter the one or more speech active portions to a predefined signal bandwidth within the scope of the present disclosure.

For example, suppose an automated speech recognition (ASR) system (e.g., speech processing system 300) is configured to process speech signals in the frequency band between e.g., 300 Hz and 7000 Hz. Accordingly, data augmentation process 10 may apply 522 signal filtering, using the signal filter (e.g., signal filter 710), to define one or more second device filtered speech active portions with a predefined signal bandwidth between e.g., 300 Hz and 7000 Hz. While an example predefined signal bandwidth of e.g., 300 Hz-7000 Hz has been described for one speech processing system, it will be appreciated that any predefined signal bandwidth for any type of speech processing system may be utilized within the scope of the present disclosure. For example, the predefined signal bandwidth may be a default range, a user-defined range, and/or may be automatically defined by data augmentation process 10.

In some implementations, data augmentation process 10 may generate 504 one or more acoustic relative transfer functions mapping reverberation from the one or more first device speech signals to the one or more second device speech signals. An acoustic relative transfer function may generally include a ratio of acoustic transfer functions between two devices that maps one or more speech signal characteristics from one device/acoustic domain to another device/acoustic domain. For example and as discussed above, suppose data augmentation process 10 defines one or more first device filtered speech active portions (e.g., first device filtered speech active portions 712) and defines one or more second device filtered speech active portions (e.g., first device filtered speech active portions 714). In this example, data augmentation process 10 may generate 504 one or more acoustic relative transfer functions (e.g., acoustic relative transfer function 716) that map reverberation from first device filtered speech active portions 712 to second device filtered speech active portions 714, or vice versa. As will be discussed in greater detail below, data augmentation process 10 may generate 504 one or more acoustic relative transfer functions mapping reverberation from the one or more first device speech signals to the one or more second device speech signals using various means including for example filter estimation algorithms and/or systems in the time domain or the frequency domain.

Generating 504 one or more acoustic relative transfer functions mapping reverberation from the one or more first device speech signals to the one or more second device speech signals may include modeling 524 the relationships between the characteristics of one or more first device speech signals and the characteristics of the one or more second device speech signals utilizing an adaptive filter. For example, data augmentation process 10 may provide the one or more first device speech signals (e.g., first device filtered speech active portions 712) and the one or more second device speech signals (e.g., second device filtered speech active portions 714) as inputs to an adaptive filter (e.g., adaptive filter 718).

Adaptive filter 718 may be configured to estimate a filter that corresponds to the acoustic relative transfer function between the speech active regions of the first device speech signal (e.g., first device filtered speech active portions 712) and the speech active regions of the second device speech signal (e.g., second device filtered speech active portions 714). Specifically, data augmentation process 10 may model 524 the mapping of reverberation from the first device speech signal (e.g., first device filtered speech active portions 712) to the second device speech signal (e.g., second device filtered speech active portions 714), or vice versa, using the adaptive filter (e.g., adaptive filter 718) in the form of one or more acoustic relative transfer functions (e.g., acoustic relative transfer function 716). Data augmentation process 10 may iteratively estimate, using the adaptive filter (e.g., adaptive filter 718), a filter mapping the reverberation from the first device speech signal (e.g., first device filtered speech active portions 712) to the second device speech signal (e.g., second device filtered speech active portions 714), or vice versa, at each sample of the first device speech signal and the second device speech signal until the acoustic relative transfer functions converge. For example, the accuracy of the model of the relationships may improve as the adaptive filter (e.g., adaptive filter 718) converges towards an optimal filter.

Convergence may indicate a threshold degree of mapping between the one or more first device speech signals to the one or more second device speech signals. For example, when the acoustic relative transfer function (e.g., acoustic relative transfer function 716) is convolved with the first device speech signal (e.g., first device filtered speech active portions 712), data augmentation process 10 should ideally provide the second device speech signal (e.g., second device filtered speech active portions 714) or a significantly equivalent speech signal. In this manner, the acoustic relative transfer function (e.g., acoustic relative transfer function 716) may be generated 504 to map the reverberation components of the first device speech signal (e.g., first device filtered speech active portions 712) to the second device speech signal (e.g., second device filtered speech active portions 714), or vice versa. For best performance, data augmentation process 10 may use the adaptive filter's estimate when the filter has converged as much as possible towards the optimal filter. In a static acoustic scenario, the adaptive filter may converge to the vicinity of the optimal filter given enough iterations (time). In a dynamic acoustic scenario, the filter may be chasing the time-varying optimal filter.

Data augmentation process 10 may model 524 the one or more first device speech signals and the one or more second device speech signals utilizing machine learning system until the one or more first device speech signals and the one or more second device speech signals converge. For example, data augmentation process 10 may train a machine learning system (e.g., machine learning system 720) to estimate a filter/acoustic relative transfer function (e.g., acoustic relative transfer mapping 716) mapping the reverberation from the first device speech signal (e.g., first device filtered speech active portions 712) to the second device speech signal (e.g., second device filtered speech active portions 714), or vice versa, at each sample of the first device speech signal and the second device speech signal until the acoustic relative transfer functions converge. For example, the machine learning system (e.g., machine learning system 720) may be configured to "learn" how to estimate the filter/acoustic relative transfer function (e.g., acoustic relative transfer mapping 716) mapping the reverberation from the first device speech signal (e.g., first device filtered speech active portions 712) to the second device speech signal (e.g., second device filtered speech active portions 714), or vice versa. In this manner, the machine learning system (e.g., machine learning system 720) may learn to estimate the acoustic transfer function using, for example, a mean square error loss function between the estimated and true transfer function. At run-time, once the machine learning system is trained, the machine learning system may estimate an acoustic relative transfer function given speech signals from a first device and a second device.

As is known in the art, a machine learning system or model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the program is provided feedback that's analogous to rewards, which it tries to maximize. While three examples of machine learning approaches have been provided, it will be appreciated that other machine learning approaches are possible within the scope of the present disclosure. Accordingly, data augmentation process 10 may utilize a machine learning model or system (e.g., machine learning system 720) to estimate the filter/acoustic relative transfer function (e.g., acoustic relative transfer mapping 716) mapping the reverberation from the first device speech signal (e.g., first device filtered speech active portions 712) to the second device speech signal (e.g., second device filtered speech active portions 714), or vice versa. While examples of generating 504 the one or more acoustic relative transfer functions have been described by modeling 524 the one or more first device speech signals and the one or more second device speech signals utilizing machine learning system or an adaptive filter until the one or more first device speech signals and the one or more second device speech signals converge, it will be appreciated that data augmentation process 10 may generate 504 the one or more acoustic relative transfer functions in various ways within the scope of the present disclosure.

Generating 504 one or more acoustic relative transfer functions mapping reverberation from the one or more first device speech signals to the one or more second device speech signals may include one or more of: generating 526 one or more static acoustic relative transfer functions; and generating 528 one or more dynamic acoustic relative transfer functions. For example, data augmentation process 10 may generate 526 one or more static acoustic relative transfer functions to map static reverberation from the one or more first device speech signals to the one or more second device speech signals. Data augmentation process 10 may generate 526 the one or more static acoustic relative transfer functions by using segments of speech from the one or more first device speech signals (e.g., first device filtered speech active portions 712) and the second device speech signal (e.g., second device filtered speech active portions 714) and extracting a single acoustic relative transfer function per segment as described above.

Data augmentation process 10 may generate 528 one or more dynamic acoustic relative transfer functions to map dynamic reverberation (i.e., time-varying) from the one or more first device speech signals to the one or more second device speech signals. Dynamic reverberation may account for speaker movement, movement of the speaker's body (e.g., head movement, torso movement, or other movements while a speaker is standing, seating, etc.), movement of a microphone device or portions of a microphone array, etc. For example, data augmentation process 10 may generate 528 the one or more dynamic acoustic relative transfer functions by extracting the acoustic relative transfer functions for each contiguous segment for each speaker. Data augmentation process 10 may run the acoustic relative transfer function estimation multiple times on the segments until initial convergence is achieved. Once initial convergence is achieved, data augmentation process 10 may continue to extract acoustic relative transfer functions at predefined time increments (e.g., every subsequent sample or any other small time shift), resulting in a set of dynamic acoustic relative transfer functions that model speaker movements in audio captured by the second device (e.g., audio recording system 104).

In some implementations, the selection of the predefined time segments may be based upon, at least in part, a speaker localization algorithm or system, which may use audio encounter information (e.g., audio encounter information 106) and/or machine vision information (e.g., machine vision encounter information 102). For example, suppose mixed-media ACD device 232 includes machine vision system 100. Machine vision encounter information 102 may be used, at least in part, by data augmentation process 10 to control the predefined time increments (i.e., by setting to those times where a speaker is actually moving above a threshold in azimuth, elevation, and/or orientation of the head).

As discussed above, data augmentation process 10 may utilize audio encounter information (e.g., audio encounter information 106) and/or machine vision information (e.g., machine vision encounter information 102) when generating 504 the one or more acoustic relative transfer functions mapping reverberation from the one or more first device speech signals to the one or more second device speech signals. For example, data augmentation process 10 may utilize audio encounter information (e.g., audio encounter information 106) and/or machine vision information (e.g., machine vision encounter information 102) to define speaker location information within the monitored environment. Data augmentation process 10 may determine the range, azimuth, elevation, and/or orientation of speakers and may associate this speaker location information with the one or more acoustic relative transfer functions (e.g., as metadata stored in a datastore).

In some implementations, data augmentation process 10 may generate 506 one or more augmented second device speech signals based upon, at least in part, the one or more acoustic relative transfer functions and first device training data. For example and as discussed above, suppose that the second device (e.g., audio recording system 104) has a limited set of training data for training a speech processing system (e.g., speech processing system 300). In some implementations and with the acoustic relative transfer function (e.g., acoustic relative transfer function 716) that maps reverberation of the first device speech signals (e.g., first device filtered speech active portions 712) to the second device speech signals (e.g., second device filtered speech active portions 714), data augmentation process 10 may generate 506 one or more augmented second device speech signals to match the reverberation components of first device speech signals.

Referring again to FIG. 7, data augmentation process 10 may access training data associated with the first device (e.g., first device training data 722). Data augmentation process 10 may generate 506 one or more augmented second device speech signals (e.g., augmented second device speech signals 724) by processing the first device training data (e.g., first device training data 722) with the one or more acoustic relative transfer functions (e.g., acoustic relative transfer function 716). In this manner, data augmentation process 10 may generate 506 augmented training data that models the reverberation components of the first device speech signals. Accordingly, data augmentation process 10 may generate 506 one or more augmented second device speech signals (e.g., augmented second device speech signals 724) for increased training data diversity (e.g., training data with diverse reverberation components) and/or for targeting a specific acoustic domain/target device.

Data augmentation process 10 may add 530 the one or more acoustic relative transfer functions to a codebook of acoustic relative transfer functions. An acoustic relative transfer function codebook (e.g., acoustic relative transfer function codebook 726) may include a data structure configured to store the one or more acoustic relative transfer functions (e.g., acoustic relative transfer function 716) mapping reverberation from the one or more first device speech signals (e.g., first device speech signal 702) to the one or more second device speech signals (e.g., second device speech signal 704). As discussed above, data augmentation process 10 may also generate and/or store speaker location information (e.g., range, azimuth, elevation, and/or orientation of speakers) associated with the one or more acoustic relative transfer functions (e.g., acoustic relative transfer function 716).

As will be discussed in greater detail below, data augmentation process 10 may utilize the acoustic relative transfer function codebook (e.g., acoustic relative transfer function codebook 726) to map, at run-time, reverberation components of speech signals of one device to the speech signals of another device. In this manner, data augmentation process 10 may allow a speech processing system trained primarily for the reverberation components of one device/acoustic domain to process the speech signals from another device/acoustic domain with significantly less mismatch.

Figure 8:
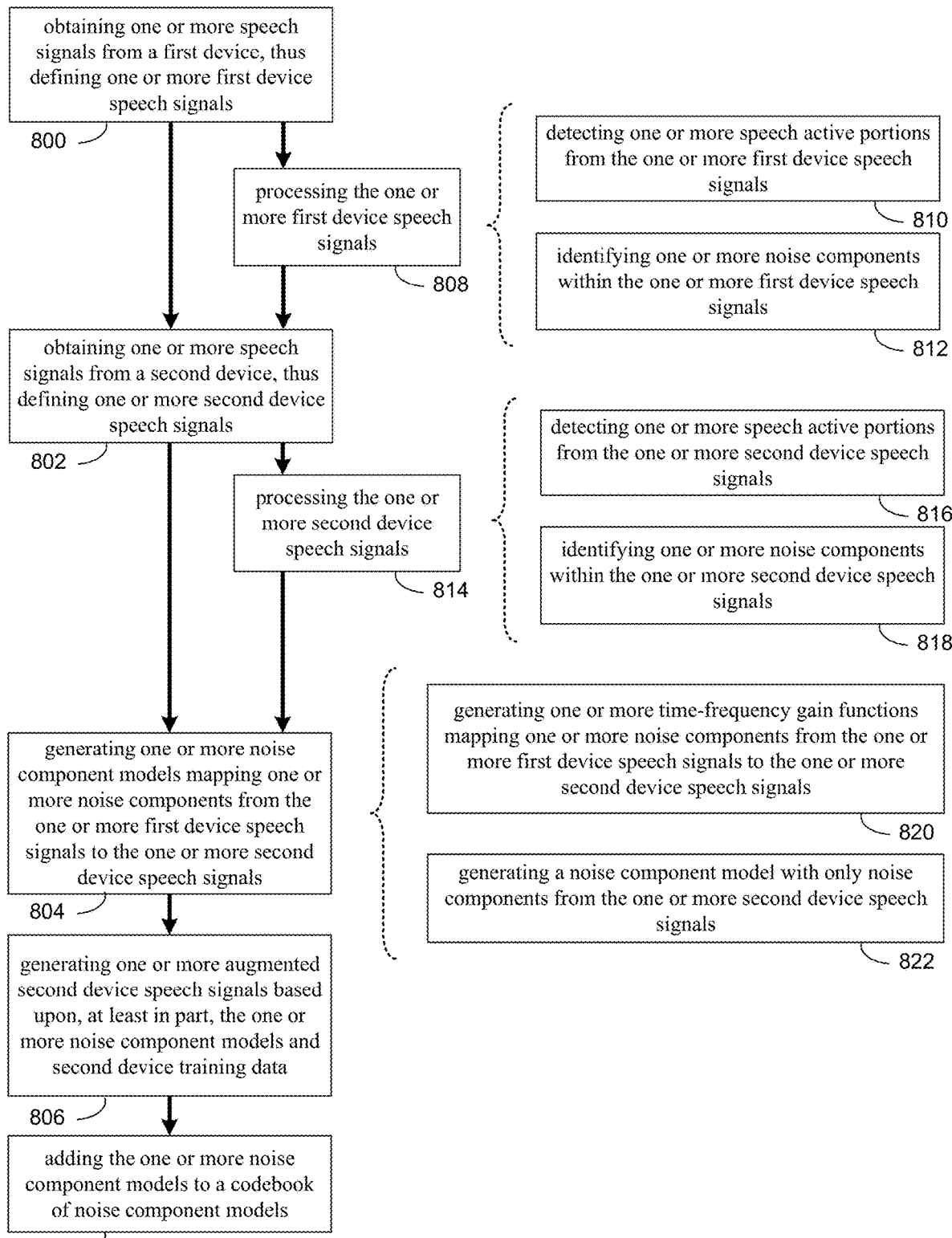
FIG. 8 is a flow chart of one implementation of the data augmentation process of FIG. 1.
Figure 9:
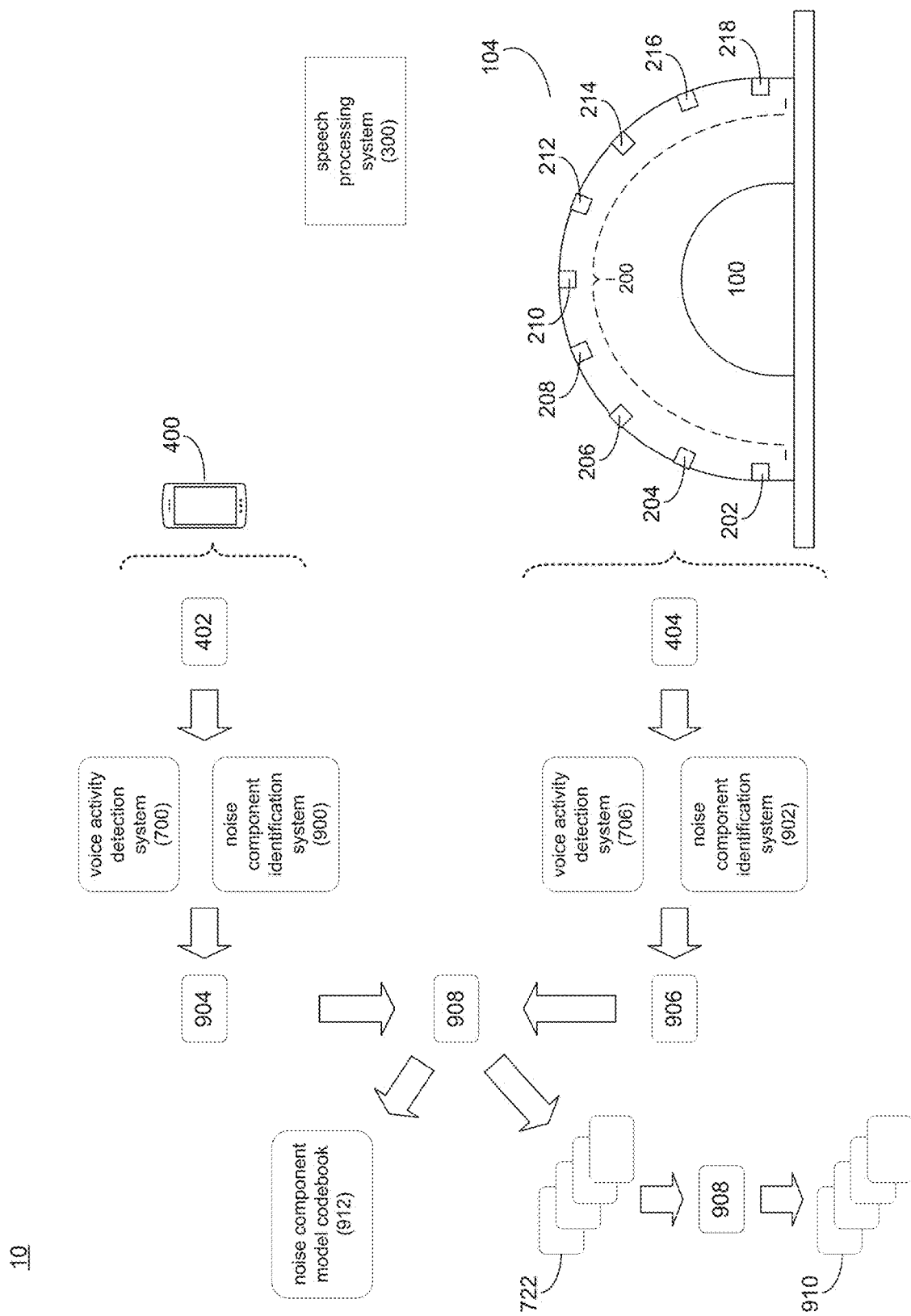
FIG. 9 is a diagrammatic view of a modular ACD system according to one implementation of the data augmentation process of FIG. 1.

Referring also to FIGS. 8-9, data augmentation process 10 may obtain 800 one or more speech signals from a first device, thus defining one or more first device speech signals. One or more speech signals may be obtained 802 from a second device, thus defining one or more second device speech signals. One or more noise component models mapping one or more noise components from the one or more first device speech signals to the one or more second device speech signals may be generated 804. One or more augmented second device speech signals may be generated 806 based upon, at least in part, the one or more noise component models and first device training data.

As will be discussed in greater detail below, data augmentation process 10 may map noise characteristics from speech signals obtained from one device (e.g., a first device) to speech signals of another device (e.g., a second device). With the mapping of noise characteristics from the first device speech signals to the second device speech signals, data augmentation process 10 may generate augmented speech signals for a second device that account for the noise characteristics of the first device (i.e., allow for de-noising of the augmented speech signals of the second device in the same manner as the de-noising of the speech signals of the first device). While noise characteristics have been discussed, it will be appreciated that data augmentation process 10 may generate augmented second device speech signals that map any acoustic characteristic(s) from a first device/acoustic domain to a second device/acoustic domain.

In some implementations and as discussed above, data augmentation process 10 may obtain 800 one or more speech signals from a first device, thus defining one or more first device speech signals. For example, suppose that the first device is e.g., handheld electronic device 400. In this example, as the first device (e.g., handheld electronic device 400) is near or adjacent to the speaker (e.g., participant 226), the first device (e.g., handheld electronic device 400) may be considered a near field microphone system (NFMS). Accordingly, data augmentation process 10 may obtain 800 one or more speech signals from the first device (e.g., handheld electronic device 400). As discussed above, the first device (e.g., handheld electronic device 400) may include a microphone component or various components configured to capture and record speech signals from one or more speakers (e.g., participant 226).

As shown in FIG. 9, data augmentation process 10 may obtain 800 one or more speech signals (e.g., speech signal 402). Speech signal 402 may represent at least a portion of audio encounter information 406 received by handheld electronic device 400 from participant 226. Data augmentation process 10 may obtain 800 and store speech signal 402 as a first device speech signal/first device speech signal recording. As will be discussed in greater detail below, the one or more speech signals (e.g., speech signal 402) may include various signal characteristics associated with the monitored space (e.g., reverberation characteristics, noise characteristics, etc.) as obtained 800 by the first device (e.g., handheld electronic device 400).

Obtaining 800 one or more speech signals from the first device may include generating and/or receiving simulated speech signals associated with the first device. For example, data augmentation process 10 may generate and/or receive one or more simulated speech signals that are designed to represent speech signals obtained by a first device. Continuing with the above example, suppose that the first device is e.g., handheld electronic device 400. Accordingly, data augmentation process 10 may generate and/or receive one or more simulated speech signals (e.g., speech signal 402). Data augmentation process 10 may obtain 800 both measured speech signals and simulated speech signals to enrich the amount of first device speech data available.

In some implementations, data augmentation process 10 may obtain 802 one or more speech signals from a second device, thus defining one or more second device speech signals. For example, suppose that the second device is e.g., audio recording system 104. In this example, as the second device (e.g., audio recording system 104) is far or not adjacent to the speaker (e.g., participant 226), the second device (e.g., audio recording system 104) may be considered a far field microphone system (FFMS). Accordingly, data augmentation process 10 may obtain 802 one or more speech signals from the second device (e.g., audio recording system 104). As discussed above, the second device (e.g., audio recording system 104) may include a plurality of discrete audio acquisition devices (e.g., audio acquisition devices 202, 204, 206, 208, 210, 212, 214, 216, 218) that may form microphone array 200 configured to capture and record speech signals from one or more speakers (e.g., participant 226).

As shown in FIG. 9, data augmentation process 10 may obtain 802 one or more speech signals (e.g., speech signal 404). Speech signal 404 may represent at least a portion of audio encounter information 106A received by audio recording system 104 from participant 226. Data augmentation process 10 may obtain 802 and store speech signal 404 as a second device speech signal/second device speech signal recording. As will be discussed in greater detail below, the one or more speech signals (e.g., speech signal 404) may include various signal characteristics associated with the monitored space (e.g., reverberation characteristics, noise characteristics, etc.) as obtained 802 by the second device (e.g., audio recording system 104).

Obtaining 802 one or more speech signals from the second device may include generating and/or receiving simulated speech signals associated with the second device. For example, data augmentation process 10 may generate and/or receive one or more simulated speech signals that are designed to represent speech signals obtained by the second device. Continuing with the above example, suppose that the second device is e.g., audio recording system 104. Accordingly, data augmentation process 10 may generate and/or receive one or more simulated speech signals (e.g., speech signal 404). Data augmentation process 10 may obtain 802 both measured speech signals and simulated speech signals to enrich the amount of second device speech data available.

Data augmentation process 10 may process 808 the one or more first device speech signals. For example and as discussed above, the one or more first device speech signals (e.g., speech signal 402) may be obtained 800 by the first device (e.g., handheld electronic device 400) and stored (e.g., within one or more datasources (e.g., datasources 118)). Processing 808 the one or more first device speech signals may include detecting 810 one or more speech active portions from the one or more first device speech signals. For example, the one or more first device speech signals (e.g., first device speech signal 402) may include portions with speech activity and/or portions without speech activity. Referring again to FIG. 9, data augmentation process 10 may detect 810, using a voice activity detector system (e.g., voice activity detection system 700), one or more speech active portions of first device speech signal 402. As is known in the art, voice activity detection system 700 may include various algorithms configured to perform noise reduction on a signal and classify various portions of the signal as speech active or speech inactive. Data augmentation process 10 may mark or otherwise indicate which portions of the one or more first device speech signals (e.g., first device speech signal 402) are speech active and/or which portions of the one or more first device speech signals (e.g., first device speech signal 402) are speech inactive.

For example, data augmentation process 10 may generate metadata that identifies portions of first device speech signal 402 that includes speech activity. In one example, data augmentation process 10 may generate acoustic metadata with timestamps indicating portions of first device speech signal 402 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 700 may include user input to classify particular portions of the signal as speech or non-speech. As will be discussed in greater detail below, data augmentation process 10 may utilize either the one or more speech active portions or one or more speech inactive portions for generating augmented data. For example and as discussed above, data augmentation process 10 may utilize the one or more speech active portions to generate one or more acoustic relative transfer functions that map reverberation components from the first device speech signals to the second device speech signals. Additionally, data augmentation process 10 may utilize the one or more speech inactive portions for generating one or more noise component models configured to represent the spectral signature of noise components from the one or more first device speech signals (e.g., first device speech signal 402).

Processing 808 the one or more first device speech signals may include identifying 812 one or more noise components within the one or more first device speech signals. For example and as discussed above, a speech signal (e.g., first speech signal 402) may include various components (e.g., noise components, speech components, etc.). Data augmentation process 10 may identify 812 one or more noise components within the one or more first device speech signals to replicate the noise spectrum of the first device speech signal. As will be discussed in greater detail below, the one or more noise components may define a noise component model that may be applied to other speech signals (e.g., second device speech signal 404). Accordingly, data augmentation process 10 may map the one or more noise components identified 812 within the one or more first device speech signal (e.g., first speech signal 402) to the one or more second device speech signals. In this manner, data augmentation process 10 may reduce noise mismatch between the first device speech signals (e.g., first device speech signals 402) and the second device speech signals (e.g., second device speech signals 404).

Identifying 812 the one or more noise components within the one or more first device speech signals may include filtering the one or more speech inactive portions from the one or more first device speech signals (e.g., first device speech signal 402) as described above. Additionally and/or alternatively, data augmentation process 10 may utilize a noise component identification system (e.g., noise component identification system 900) configured to isolate and identify noise components within first device speech signal 402. In some implementations, the one or more noise components may include a distribution of noise within the one or more first device speech signals. For example, suppose that handheld electronic device 400 is adjacent to patient seating. In this example, first device speech signal 402 may include a distribution of noise components (e.g., as a function of time and/or frequency) based upon, at least in part, the proximity of handheld electronic device to the patient seating.

In some implementations, data augmentation process 10 may label the one or more noise components metadata with timestamps indicating noise components of first device speech signal 402 (e.g., start and end times for each portion). Data augmentation process 10 may label noise components as a time domain label (i.e., a set of samples of the signal include or are speech) or as a set of frequency domain labels (i.e., a vector that gives the likelihood that a particular frequency bin in a certain time frame includes or is noise). Referring again to FIG. 9, data augmentation process 10 may identify 812 one or more noise components (e.g., noise components 904) within the one or more first device speech signals (e.g., first device speech signals 402). It will be appreciate that noise components 904 may represent any number of noise components for any number of first device speech signals within the scope of the present disclosure.

As discussed above, data augmentation process 10 may process 814 the one or more second device speech signals. For example and as discussed above, the one or more second device speech signals (e.g., speech signal 404) may be obtained 802 by the second device (e.g., audio recording system 104) and stored (e.g., within one or more datasources (e.g., datasources 118)). Processing 814 the one or more second device speech signals may include detecting 816 one or more speech active portions from the one or more second device speech signals. For example, the one or more second device speech signals (e.g., second device speech signal 404) may include portions with speech activity and/or portions without speech activity. Referring again to FIG. 9, data augmentation process 10 may detect 816, using a voice activity detector system (e.g., voice activity detection system 706), one or more speech active portions of second device speech signal 404. As is known in the art, voice activity detection system 706 may include various algorithms configured to perform noise reduction on a signal and classify various portions of the signal as speech active or speech inactive. Data augmentation process 10 may mark or otherwise indicate which portions of the one or more second device speech signals (e.g., second device speech signal 404) are speech active and/or which portions of the one or more second device speech signals (e.g., second device speech signal 404) are speech inactive. Voice activity detection system 706 may be the same as voice activity detection system 700 and/or may include unique algorithms for detecting speech active portions within the second device speech signals (e.g., second device speech signal 404).

For example, data augmentation process 10 may generate metadata that identifies portions of second device speech signal 402 that includes speech activity. In one example, data augmentation process 10 may generate metadata with timestamps indicating portions of second device speech signal 404 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 706 may include user input to classify particular portions of the signal as speech or non-speech. As will be discussed in greater detail below, data augmentation process 10 may utilize either the one or more speech active portions or one or more speech inactive portions for generating augmented data. For example, data augmentation process 10 may utilize the one or more speech active portions to generate one or more acoustic relative transfer functions that map reverberation components from the second device speech signals to the second device speech signals. Additionally, data augmentation process 10 may utilize the one or more speech inactive portions for generating one or more noise component models configured to represent the spectral signature of noise components from the one or more second device speech signals (e.g., second device speech signal 404).

Processing 814 the one or more second device speech signals may include identifying 818 one or more noise components within the one or more second device speech signals. Data augmentation process 10 may identify 818 one or more noise components within the one or more second device speech signals to generate a noise component model for mapping the noise spectrum of the one or more first device speech signals to the one or more second device speech signals. In this manner, data augmentation process 10 may reduce noise mismatch between the one or more first device speech signals (e.g., first device speech signals 402) and the one or more second device speech signals (e.g., second device speech signals 404). Referring again to FIG. 9, data augmentation process 10 may identify 818 one or more noise components (e.g., noise components 906) within the one or more second device speech signals (e.g., second device speech signals 404). It will be appreciate that noise components 906 may represent any number of noise components for any number of second device speech signals within the scope of the present disclosure.

Identifying 818 the one or more noise components within the one or more second device speech signals may include filtering the one or more speech inactive portions from the one or more second device speech signals (e.g., second device speech signal 404) as described above. Additionally and/or alternatively, data augmentation process 10 may utilize a noise component identification system (e.g., noise component identification system 902) configured to isolate and identify noise components within second device speech signal 404. Noise component identification system 902 may be different from or the same as noise component identification system 900. In some implementations, the one or more noise components may include a distribution of noise within the one or more second device speech signals. For example, suppose that audio recording device 104 is adjacent to a doorway. In this example, second device speech signal 404 may include a distribution of noise components (e.g., as a function of time and/or frequency) based upon, at least in part, the proximity of audio recording system 104 to the doorway.

In some implementations, data augmentation process 10 may label the one or more noise components metadata with timestamps indicating noise components of second device speech signal 404 (e.g., start and end times for each portion). Data augmentation process 10 may label noise components as a time domain label (i.e., a set of samples of the signal include or are speech) or as a set of frequency domain labels (i.e., a vector that gives the likelihood that a particular frequency bin in a certain time frame includes or is noise).

In some implementations, data augmentation process 10 may generate 804 one or more noise component models mapping one or more noise components from the one or more first device speech signals to the one or more second device speech signals. A noise component model may generally include a representation of mapping of the noise characteristics from one speech signal/acoustic domain to another speech signal/acoustic domain. As discussed above, the noise component model (e.g., noise component model 908) may include a mapping of a distribution of noise components (e.g., as a function of time and/or frequency) from a first device speech signal to a second device speech signal. For example, a noise component model may include a mapping function involving, but not limited to, frequency dependent mapping, time dependent mapping, and/or time-frequency dependent mapping.

Generating 804 one or more noise component models mapping one or more noise components from the one or more first device speech signals to the one or more second device speech signals may include generating 820 one or more time-frequency gain functions mapping one or more noise components from the one or more first device speech signals to the one or more second device speech signals. For example, a time-frequency gain function may be a multiplicative time-frequency (TF) function that maps the spectrum of the first device speech signal noise components (e.g., noise components 904) to the second device speech signal noise components (e.g., noise components 906).

Data augmentation process 10 may generate 820 the one or more time-frequency gain functions by converting the one or more noise components (e.g., noise components 904, 906) to the Short-Time Fourier Transform (STFT) domain. While a STFT is discussed as a way of generate 820 the one or more time-frequency gain functions, it will be appreciated that other transformations may be used within the scope of the present disclosure. Converting the one or more noise components (e.g., noise components 904, 906) to the STFT domain may include applying overlapped framing with an analysis window. For example, noise components 904, 906 may be recorded as a time waveform in the time domain. Data augmentation process 10 may apply short-time windows (e.g., Hamming windows to e.g., 40 milliseconds of data and shifting by e.g., 10 milliseconds). Data augmentation process 10 may average several short terms frames (e.g., over a 500 millisecond segment) and convert each of the short excerpts to the frequency domain by applying a Fourier transform in combination with a window function, where such window functions are known in the art. Data augmentation process 10 may measure the signal-to-noise ratios (SNR) for the noise components for each device.

Generating 820 the one or more time-frequency gain functions mapping one or more noise components from the one or more first device speech signals to the one or more second device speech signals may include dividing the STFT noise component spectra to obtain a time-frequency gain function that maps the noise components (e.g., distribution of noise components) from the one or more first device speech signals (e.g., first device speech signal 402) to the one or more second device speech signals. Accordingly, data augmentation process 10 may generate 820 a noise component model (e.g., noise component model 908) that includes a time-frequency gain function configured to map noise components from the one or more first device speech signals to the one or more second device speech signals by dividing the STFT noise components of the first device speech signals by the STFT noise components of the second device speech signals. In some implementations, data augmentation process 10 may divide the noise components across multiple frequencies as a single ratio to generate a time-frequency gain value and/or for each frequency bin of the STFT domain to generate a vector of time-frequency gain values for each frequency bin.

Generating 804 one or more noise component models mapping one or more noise components from the one or more first device speech signals to the one or more second device speech signals may include generating 822 a noise component model with only noise components from the one or more second device speech signals. For example, suppose that the first device speech signal has minimal noise or no noise component (e.g., suppose that handheld electronic device 400 includes a headset microphone). In some implementations, data augmentation process 10 may determine whether to generate 820 a time-frequency gain function or to generate 822 a noise component model with only noise components from the second device speech signals based upon, at least in part, determining whether the one or more first device speech signals include at least a threshold amount of noise. The threshold amount of noise may be user-defined, automatically defined via data augmentation process 10, and/or a default noise threshold (e.g., 30 dB). In this example, data augmentation process 10 may generate noise component model 908 with only noise components 906 because speech signal 402 does not include a threshold amount of noise.

In some implementations, data augmentation process 10 may generate 806 one or more augmented second device speech signals based upon, at least in part, the one or more noise component models and first device training data. For example and as discussed above, suppose that the second device (e.g., audio recording system 104) has a limited set of training data for training a speech processing system (e.g., speech processing system 300). In this example, data augmentation process 10 may generate 806 augmented second device speech data that maps the noise components (noise components 904) from the one or more first device speech signals (e.g., first device speech signals 402) to the noise components (e.g., noise components 906) of the one or more second device speech signals (e.g., second device speech signals 404).

In some implementations and with the noise component model (e.g., noise component model 908) that maps noise components of the one or more first device speech signals (e.g., noise components 904) to the noise components of the one or more second device speech signals (e.g., noise components 906), data augmentation process 10 may generate 806 one or more augmented second device speech signals to match the noise components of the first device speech signals. Referring again to FIG. 9, data augmentation process 10 may access training data associated with the first device (e.g., first device training data 722). Data augmentation process 10 may generate 806 one or more augmented second device speech signals (e.g., augmented second device speech signals 910) by processing the first device training data (e.g., first device training data 722) with the one or more noise component models (e.g., noise component model 908). In this manner, data augmentation process 10 may generate 806 augmented training data that models the noise components of the first device speech signals. Accordingly, data augmentation process 10 may generate 806 one or more augmented second device speech signals (e.g., augmented second device speech signals 910) for increased training data diversity (e.g., training data with diverse reverberation components) and/or for targeting a specific acoustic domain/target device.

Data augmentation process 10 may add 824 the one or more noise component models to a codebook of noise component models. A noise component model codebook (e.g., noise component model codebook 912) may include a data structure configured to store the one or more noise component models (e.g., noise component model 912) mapping noise from the one or more first device speech signals (e.g., first device speech signal 402) to the one or more second device speech signals (e.g., second device speech signal 404). As discussed above, data augmentation process 10 may also generate and/or store speaker location information (e.g., range, azimuth, elevation, and/or orientation of speakers) associated with the one or more noise component models (e.g., noise component model 912). As will be discussed in greater detail below, data augmentation process 10 may utilize the noise component model codebook (e.g., noise component model codebook 912) to map, at run-time, noise components of speech signals of one device to the speech signals of another device. In this manner, data augmentation process 10 may allow a speech processing system trained primarily for the noise components of one device/acoustic domain to process the speech signals from another device/acoustic domain with significantly less mismatch.

Figure 10:
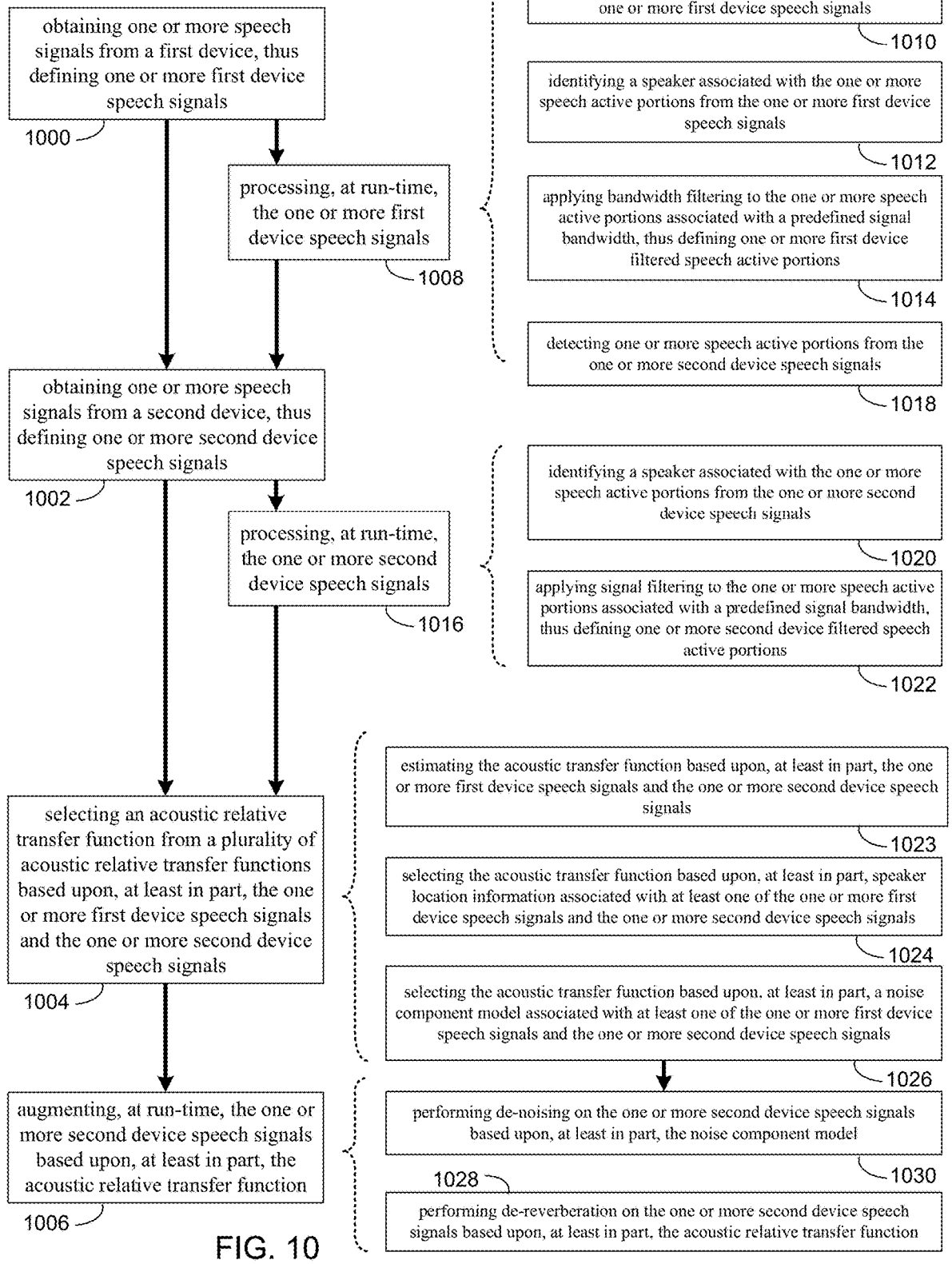
FIG. 10 is a flow chart of one implementation of the data augmentation process of FIG. 1.
Figure 11:
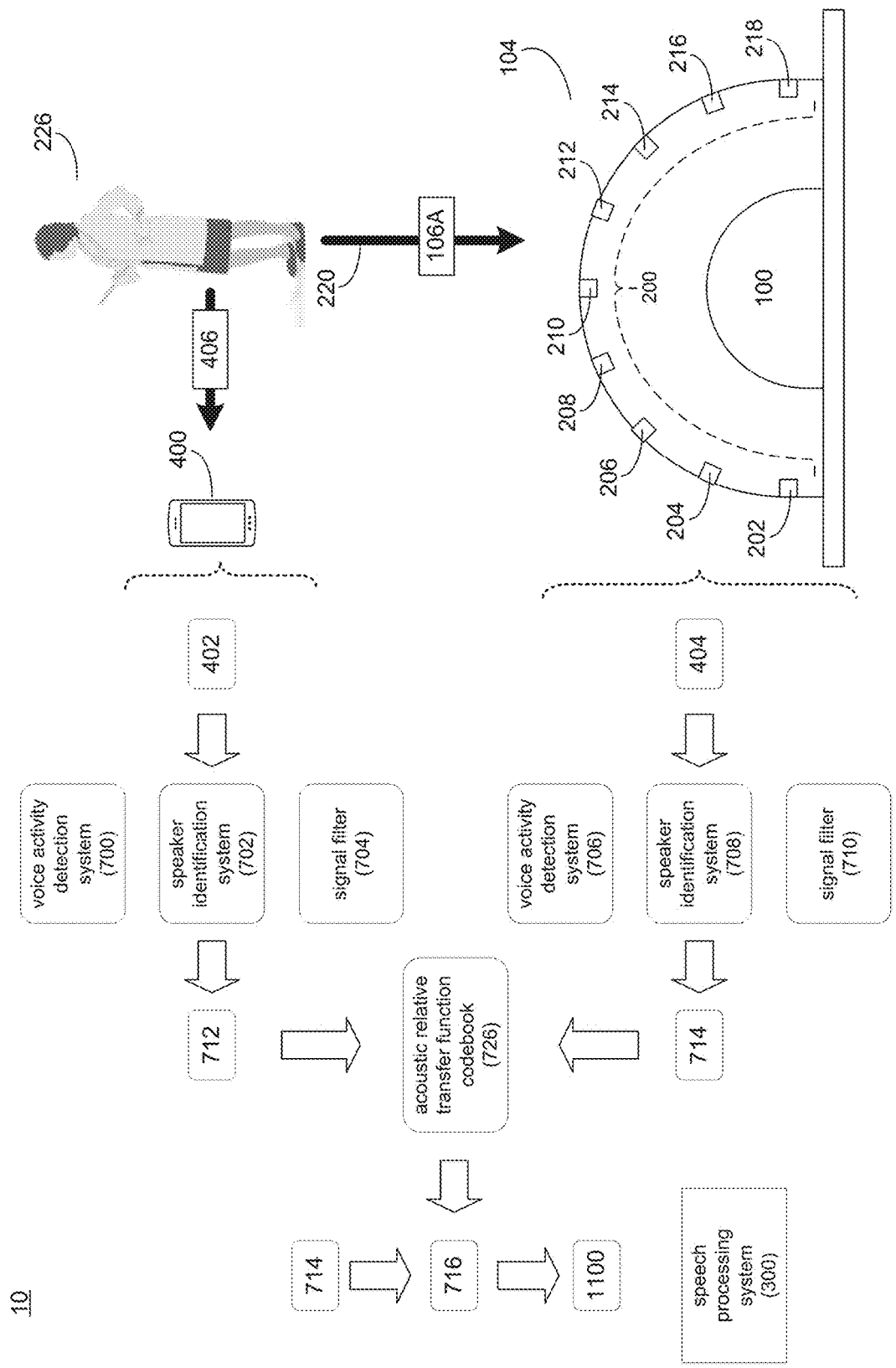
FIG. 11 is a diagrammatic view of a modular ACD system according to one implementation of the data augmentation process of FIG. 1.

Referring also to FIGS. 10-11, data augmentation process 10 may obtain 1000 one or more speech signals from a first device, thus defining one or more first device speech signals. One or more speech signals may be obtained 1002 from a second device, thus defining one or more second device speech signals. An acoustic relative transfer function may be selected 1004 from a plurality of acoustic relative transfer functions based upon, at least in part, the one or more first device speech signals and the one or more second device speech signals. The one or more second device speech signals may be augmented 1006, at run-time, based upon, at least in part, the acoustic relative transfer function.

During processing of speech signals in a multi-microphone system at run-time, multiple microphone devices (e.g., handheld electronic device 400 and audio recording system 104) may be configured to process speech signals from the same speaker(s) (e.g., participant 226). As discussed above, each microphone device may record distinct signal characteristics (e.g., reverberation, noise, gain, etc.). When a speech processing system (e.g., speech processing system 300) processes the speech signals from each device, mismatch in these signal characteristics may reduce the performance of the speech processing system (e.g., lower quality speech processing, introduction of erroneous words into transcripts, etc.). Accordingly, data augmentation process 10 may augment, at run-time, speech signals from one microphone device to include at least a portion of the signal characteristics of another microphone device to reduce speech signal mismatch.

In some implementations, data augmentation process 10 may obtain 1000 one or more speech signals from a first device, thus defining one or more first device speech signals. For example, suppose that the first device is e.g., handheld electronic device 400. In this example, as the first device (e.g., handheld electronic device 400) is near or adjacent to the speaker (e.g., participant 226), the first device (e.g., handheld electronic device 400) may be considered a near field microphone system (NFMS). Accordingly, data augmentation process 10 may obtain 1000 one or more speech signals from the first device (e.g., handheld electronic device 400). As discussed above, the first device (e.g., handheld electronic device 400) may include a microphone component or various components configured to capture and record speech signals from one or more speakers (e.g., participant 226). Referring also to FIG. 11, data augmentation process 10 may obtain 1000 one or more first device speech signals (e.g., speech signal 402). Speech signal 402 may represent at least a portion of audio encounter information 406 received by handheld electronic device 400 from participant 226. Data augmentation process 10 may obtain 1000 and store speech signal 402 as a first device speech signal/first device speech signal recording. As will be discussed in greater detail below, the one or more speech signals (e.g., speech signal 402) may include various signal characteristics associated with the monitored space (e.g., reverberation characteristics, noise characteristics, etc.) as obtained 1000 by the first device (e.g., handheld electronic device 400).

In some implementations, data augmentation process 10 may obtain 1002 one or more speech signals from a second device, thus defining one or more second device speech signals. For example, suppose that the second device is e.g., audio recording system 104. In this example, as the second device (e.g., audio recording system 104) is far or not adjacent to the speaker (e.g., participant 226), the second device (e.g., audio recording system 104) may be considered a far field microphone system (FFMS). Accordingly, data augmentation process 10 may obtain 1002 one or more speech signals from the second device (e.g., audio recording system 104). As discussed above, the second device (e.g., audio recording system 104) may include a plurality of discrete audio acquisition devices (e.g., audio acquisition devices 202, 204, 206, 208, 210, 212, 214, 216, 218) that may form microphone array 200 configured to capture and record speech signals from one or more speakers (e.g., participant 226). Referring again to FIG. 11, data augmentation process 10 may obtain 1002 one or more speech signals (e.g., speech signal 404). Speech signal 404 may represent at least a portion of audio encounter information 106A received by audio recording system 104 from participant 226. Data augmentation process 10 may obtain 1002 and store speech signal 404 as a second device speech signal/second device speech signal recording.

As discussed above, data augmentation process 10 may process 1008, at run-time, the one or more first device speech signals. For example and as discussed above, the one or more first device speech signals (e.g., speech signal 402) may be obtained 1000 by the first device (e.g., handheld electronic device 400). Processing 1008 the one or more first device speech signals may include detecting 1010 one or more speech active portions from the one or more first device speech signals. For example, the one or more first device speech signals (e.g., first device speech signal 402) may include portions with speech activity and/or portions without speech activity. Referring also to FIG. 11, data augmentation process 10 may detect 1010, using a voice activity detector system (e.g., voice activity detection system 700), one or more speech active portions of first device speech signal 402. As is known in the art, voice activity detection system 700 may include various algorithms configured to perform noise reduction on a signal and classify various portions of the signal as speech active or speech inactive. Data augmentation process 10 may mark or otherwise indicate which portions of the one or more first device speech signals (e.g., first device speech signal 402) are speech active and/or which portions of the one or more first device speech signals (e.g., first device speech signal 402) are speech inactive.

For example, data augmentation process 10 may generate metadata that identifies portions of first device speech signal 402 that includes speech activity. In one example, data augmentation process 10 may generate acoustic metadata with timestamps indicating portions of first device speech signal 402 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 700 may receive user input to classify particular portions of the signal as speech or non-speech. As will be discussed in greater detail below, data augmentation process 10 may utilize either the one or more speech active portions or one or more speech inactive portions for generating augmented data. For example, data augmentation process 10 may utilize the one or more speech active portions to generate one or more acoustic relative transfer functions that map reverberation components from the first device speech signals to the second device speech signals. Additionally, data augmentation process 10 may utilize the one or more speech inactive portions for generating one or more noise component models configured to represent the spectral signature of noise components from the one or more first device speech signals (e.g., first device speech signal 402).

For example, data augmentation process 10 may process 1008 the one or more first device speech signals (e.g., first device speech signal 402) to identify 1012 a speaker associated with the one or more speech active portions. Data augmentation process 10 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource.

In some implementations, data augmentation process 10 may compare the data included within the user profile (defined within the user profile datasource) to at least a portion of the speech active portions from the one or more first device speech signals using a speaker identification system (e.g., speaker identification system 702). The data included within the user profile may include voice-related data (e.g., a voice print that is defined locally within the user profile or remotely within the voice print datasource), language use patterns, user accent identifiers, user-defined macros, and user-defined shortcuts, for example. Specifically and when attempting to associate at least a portion of the speech active portions from the one or more first device speech signals with at least one known encounter participant, data augmentation process 10 may compare one or more voice prints (defined within the voice print datasource) to one or more voices defined within the speech active portions from the one or more first device speech signals. As is known in the art, a speaker identification system (e.g., speaker identification system 702) may generally include various algorithms for comparing speech signals to voice prints to identify particular known speakers. In some implementations, data augmentation process 10 may utilize the speaker identity to correlate speech portions from first device speech signals with a speaker in second device speech signals.

Processing 1008 the one or more first device speech signals may include applying 1014 signal filtering to the one or more speech active portions associated with a predefined signal bandwidth, thus defining one or more first device filtered speech active portions. For example, speech components of a speech signal may be generally limited to particular frequencies of interest. Additionally, various speech processing systems may utilize various frequency ranges when processing speech. Accordingly, data augmentation process 10 may utilize one or more signal filters (e.g., signal filter 704) to filter the one or more speech active portions to a predefined signal bandwidth, thus defining one or more first device filtered speech active portions (e.g., first device filtered speech active portions 712). In one example, data augmentation process 10 may utilize band-pass filter(s) for signal filter 704. However, it will be appreciated that various filters may be utilized to filter the one or more speech active portions to a predefined signal bandwidth within the scope of the present disclosure.

Data augmentation process 10 may process 1016, at run-time, the one or more second device speech signals. For example and as discussed above, the one or more second device speech signals (e.g., speech signal 404) may be obtained 1002 by the second device (e.g., audio recording system 104). Processing 1016 the one or more second device speech signals may include detecting 1018 one or more speech active portions from the one or more second device speech signals. For example, the one or more second device speech signals (e.g., second device speech signal 404) may include portions with speech activity and/or portions without speech activity.

Referring again to FIG. 11, data augmentation process 10 may detect 1018, using a voice activity detector system (e.g., voice activity detection system 706), one or more speech active portions of second device speech signal 404. As is known in the art, voice activity detection system 706 may include various algorithms configured to perform noise reduction on a signal and classify various portions of the signal as speech active or speech inactive. Data augmentation process 10 may mark or otherwise indicate which portions of the one or more second device speech signals (e.g., second device speech signal 404) are speech active and/or which portions of the one or more second device speech signals (e.g., second device speech signal 404) are speech inactive. Voice activity detection system 706 may be the same as voice activity detection system 700 and/or may include unique algorithms for detecting speech active portions within the second device speech signals (e.g., second device speech signal 404).

For example, data augmentation process 10 may generate metadata that identifies portions of second device speech signal 402 that includes speech activity. In one example, data augmentation process 10 may generate metadata with timestamps indicating portions of second device speech signal 404 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 706 may include user input to classify particular portions of the signal as speech or non-speech. As will be discussed in greater detail below, data augmentation process 10 may utilize either the one or more speech active portions or one or more speech inactive portions for generating augmented data. For example, data augmentation process 10 may utilize the one or more speech active portions to generate one or more acoustic relative transfer functions that map reverberation components from the second device speech signals to the second device speech signals. Additionally, data augmentation process 10 may utilize the one or more speech inactive portions for generating one or more noise component models configured to represent the spectral signature of noise components from the one or more second device speech signals (e.g., second device speech signal 404).

Processing 1016 the one or more second device speech signals may include identifying 1020 a speaker associated with the one or more speech active portions from the one or more second device speech signals. For example, data augmentation process 10 may process 1016 the one or more second device speech signals (e.g., second device speech signal 404) to identify 1020 a speaker associated with the one or more speech active portions. Data augmentation process 10 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource.

In some implementations, data augmentation process 10 may compare the data included within the user profile (defined within the user profile datasource) to at least a portion of the speech active portions from the one or more second device speech signals using a speaker identification system (e.g., speaker identification system 708). The data included within the user profile may include voice-related data (e.g., a voice print that is defined locally within the user profile or remotely within the voice print datasource), language use patterns, user accent identifiers, user-defined macros, and user-defined shortcuts, for example. Specifically and when attempting to associate at least a portion of the speech active portions from the one or more second device speech signals with at least one known encounter participant, data augmentation process 10 may compare one or more voice prints (defined within the voice print datasource) to one or more voices defined within the speech active portions from the one or more second device speech signals. As is known in the art, a speaker identification system (e.g., speaker identification system 708) may generally include various algorithms for comparing speech signals to voice prints to identify particular known speakers. Speaker identification system 708 may be the same as speaker identification system 702 and/or may include unique algorithms for detecting speech active portions within the second device speech signals (e.g., second device speech signal 404).

Processing 1016 the one or more second device speech signals may include applying 1022 signal filtering to the one or more speech active portions associated with a predefined signal bandwidth, thus defining one or more second device filtered speech active portions. For example, speech components of a speech signal may be generally limited to particular frequencies of interest. Additionally, various speech processing systems may utilize various frequency ranges when processing speech. Accordingly, data augmentation process 10 may utilize one or more signal filters (e.g., signal filter 710) to filter the one or more speech active portions to a predefined signal bandwidth, thus defining one or more second device filtered speech active portions (e.g., second device filtered speech active portions 714).

In some implementations, data augmentation process 10 may select 1004 an acoustic relative transfer function from a plurality of acoustic relative transfer functions based upon, at least in part, the one or more first device speech signals and the one or more second device speech signals. As discussed above, an acoustic relative transfer function may represent a mapping of the reverberation from one device/acoustic domain to another device/acoustic domain. At run-time, mismatch in the reverberation characteristics between the first microphone device and the second microphone device may result in degraded performance of a speech processing system. Accordingly, data augmentation process 10 may utilize an acoustic relative transfer function from a codebook of acoustic relative transfer functions to augment speech signals of the second microphone device to more generally match the reverberation characteristics of the first microphone device.

Selecting 1004 an acoustic relative transfer function from a plurality of acoustic relative transfer functions based upon, at least in part, the one or more first device speech signals and the one or more second device speech signals may include one or more of: estimating 1023 the acoustic transfer function based upon, at least in part, the one or more first device speech signals and the one or more second device speech signals; selecting 1024 the acoustic transfer function based upon, at least in part, speaker location information associated with at least one of the one or more first device speech signals and the one or more second device speech signals; and selecting 1026 the acoustic transfer function based upon, at least in part, a noise component model associated with at least one of the one or more first device speech signals and the one or more second device speech signals. For example and in addition to selecting a previously generated acoustic relative transfer, data augmentation process 10 may select 1004 an acoustic relative transfer function by estimating 1023 the acoustic relative transfer function at run-time. For example and as discussed above, data augmentation process 10 may train a machine learning model (e.g., machine learning model 720) to estimate an acoustic relative transfer function based upon, at least in part, the one or more first device speech signals and the one or more second device speech signals. At run-time, data augmentation process 10 may utilize the first device speech signals and the second device speech signals to estimate 1023 an acoustic relative transfer function for the acoustic environment.

Referring again to FIG. 11 and as discussed above, data augmentation process 10 may generate and/or store speaker location information (e.g., range, azimuth, elevation, and/or orientation of speakers) associated with each acoustic relative transfer function stored in the acoustic relative transfer function codebook (e.g., acoustic relative transfer function codebook 726). Accordingly, data augmentation process 10 may compare speaker location information from the first device filtered speech active portions (e.g., first device filtered speech active portions 712) and the speaker location information from the second device filtered speech active portions (e.g., second device filtered speech active portions 714) to the stored speaker location information associated with each acoustic relative transfer function stored in the acoustic relative transfer function codebook (e.g., acoustic relative transfer function codebook 726).

Data augmentation process 10 may utilize the speaker location information from the first device filtered speech active portions (e.g., first device filtered speech active portions 712) and the speaker location information from the second device filtered speech active portions (e.g., second device filtered speech active portions 714) to select 1024 an acoustic relative transfer function with sufficiently similar speaker location information. For example, data augmentation process 10 may utilize a predefined similarity threshold when selecting 1024 an acoustic relative transfer function. The predefined similarity threshold may be user-defined, automatically defined by data augmentation process 10, and/or a default value.

As discussed above, data augmentation process 10 may identify one or more noise components of the one or more first device speech signals and/or the second device speech signals. For example and as discussed above, data augmentation process 10 may characterize each acoustic relative transfer function codebook entry with the long term spectral features of the background (i.e., average noise spectrum, spectral centroid/flatness, etc.). Using a voice activity detection system (e.g., voice activity detection system 700) and/or a noise component identification system (e.g., noise component identification system 900), data augmentation process 10 may select 1026 the codebook entry from the acoustic relative transfer function codebook (e.g., acoustic relative transfer function codebook 726) that has similar noise characteristics to the one or more first device speech signals (e.g., first device speech signal 402) and/or the second device speech signals (e.g., second device speech signal 404). For example, data augmentation process 10 may utilize a predefined similarity threshold when selecting 1026 an acoustic relative transfer function. The predefined similarity threshold may be user-defined, automatically defined by data augmentation process 10, and/or a default value.

In some implementations, data augmentation process 10 may augment 1006, at run-time, the one or more second device speech signals based upon, at least in part, the acoustic relative transfer function. For example and as discussed above, mismatch between characteristics of speech signals received by multiple microphone systems may degrade speech processing system performance.

Accordingly, data augmentation process 10 may utilize one or more acoustic relative transfer functions to augment 1006 one or more second device speech signals to generally match the reverberation characteristics of the one or more first device speech signals. For example, data augmentation process 10 may augment 1006 second device speech signal 404 received by audio recording system 104 by applying the selected acoustic relative transfer function (e.g., acoustic relative transfer function 716). Applying the selected acoustic relative transfer function (e.g., acoustic relative transfer function 716) may generally include convolving second device speech signal 404 with acoustic relative transfer function 716 to yield augmented second device speech signal 1100. In this example, augmented second device speech signal 1100 may generally include the reverberation characteristics of the one or more first device speech signal (e.g., first device speech signal 402). Accordingly, data augmentation process 10 may process, via speech processing system 300, augmented second device speech signal 1100 with first device speech signal 402.

Augmenting 1006, at run-time, the one or more second device speech signals based upon, at least in part, the acoustic relative transfer function may include performing 1028 de-reverberation on the one or more second device speech signals based upon, at least in part, the acoustic relative transfer function. For example and as discussed above, augmenting 1006 the one or more second device speech signals may include modifying the reverberation characteristics of the one or more second device speech signals to more closely match the reverberation characteristics of the one or more first device speech signals. Accordingly, data augmentation process 10 may augment 1006 second device speech signal 404 by performing 1028 de-reverberation on second device speech signal 404 based upon, at least in part, acoustic relative transfer function 716. Additionally, it will be appreciated that data augmentation process 10 may add or supplement reverberation or a reverberation distribution to second device speech signal 404 based upon, at least in part, acoustic relative transfer function 716.

Augmenting 1006, at run-time, the one or more second device speech signals based upon, at least in part, the acoustic relative transfer function may include performing 1030 de-noising on the one or more second device speech signals based upon, at least in part, the noise component model. For example, while an example of augmenting reverberation components has been provided, it will be appreciated that other speech signal components may be augmented as well within the scope of the present disclosure. As will be discussed in greater detail below, data augmentation process 10 may select a noise component model from a plurality of noise component models of a noise component model codebook (e.g., noise component model codebook 912) based upon, at least in part, the one or more first device speech signals and the one or more second device speech signals. Accordingly, data augmentation process 10 may utilize a selected noise component model from noise component model codebook 912 to augment 1006 second device speech signal 404 to include (or to not include) noise components of first device speech signal 402. In some implementations, applying the selected noise component model may include performing 1030 de-noising on second device speech signal 404 by removing and/or attenuating noise components from the second device speech signal. Additionally, data augmentation process 10 may add or supplement noise components to second device speech signal 404 to more closely match a noise characteristic or distribution of first device speech signal 402 based upon, at least in part, the selected noise component model.

Figure 12:
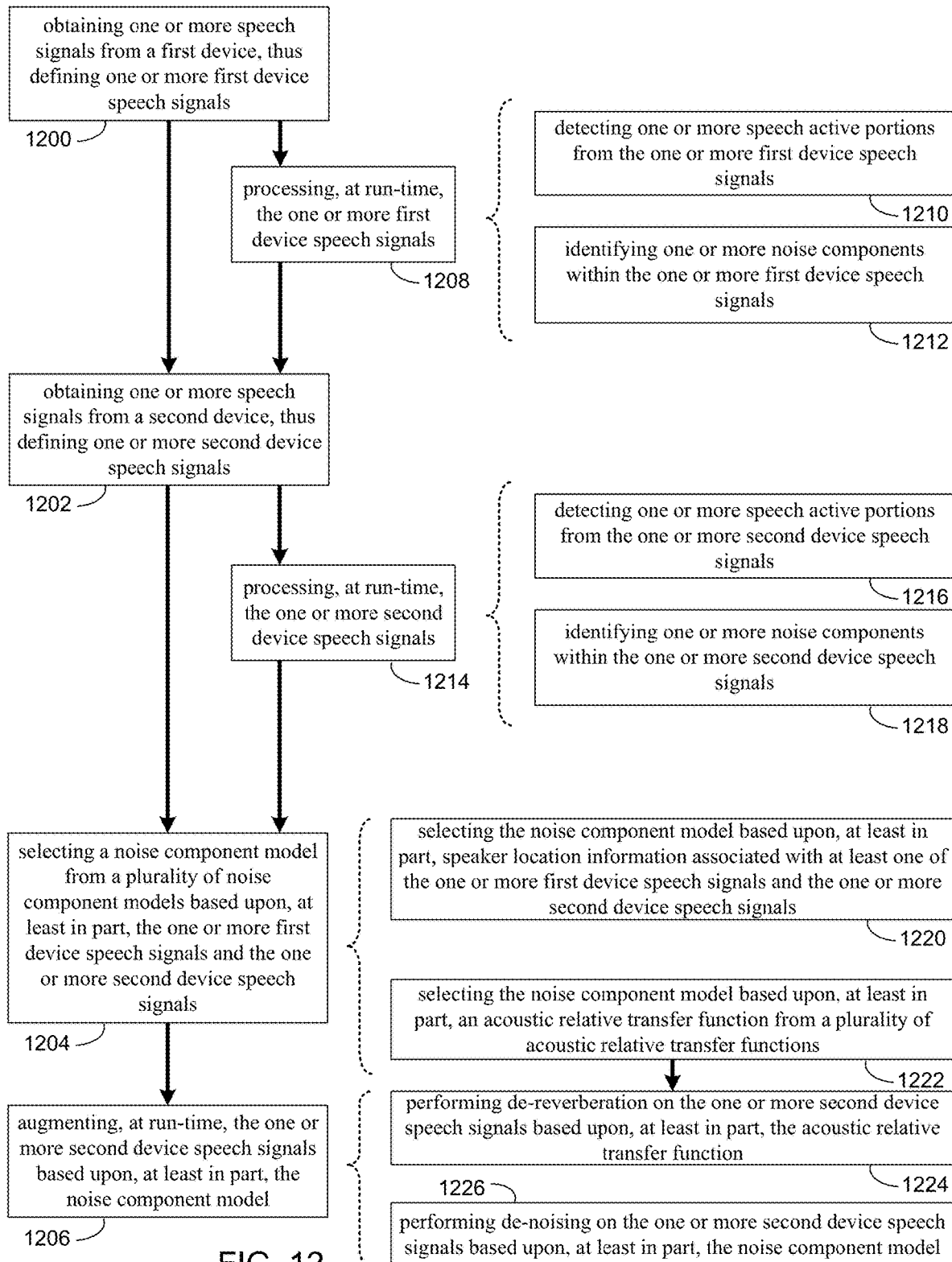
FIG. 12 is a flow chart of one implementation of the data augmentation process of FIG. 1.
Figure 13:
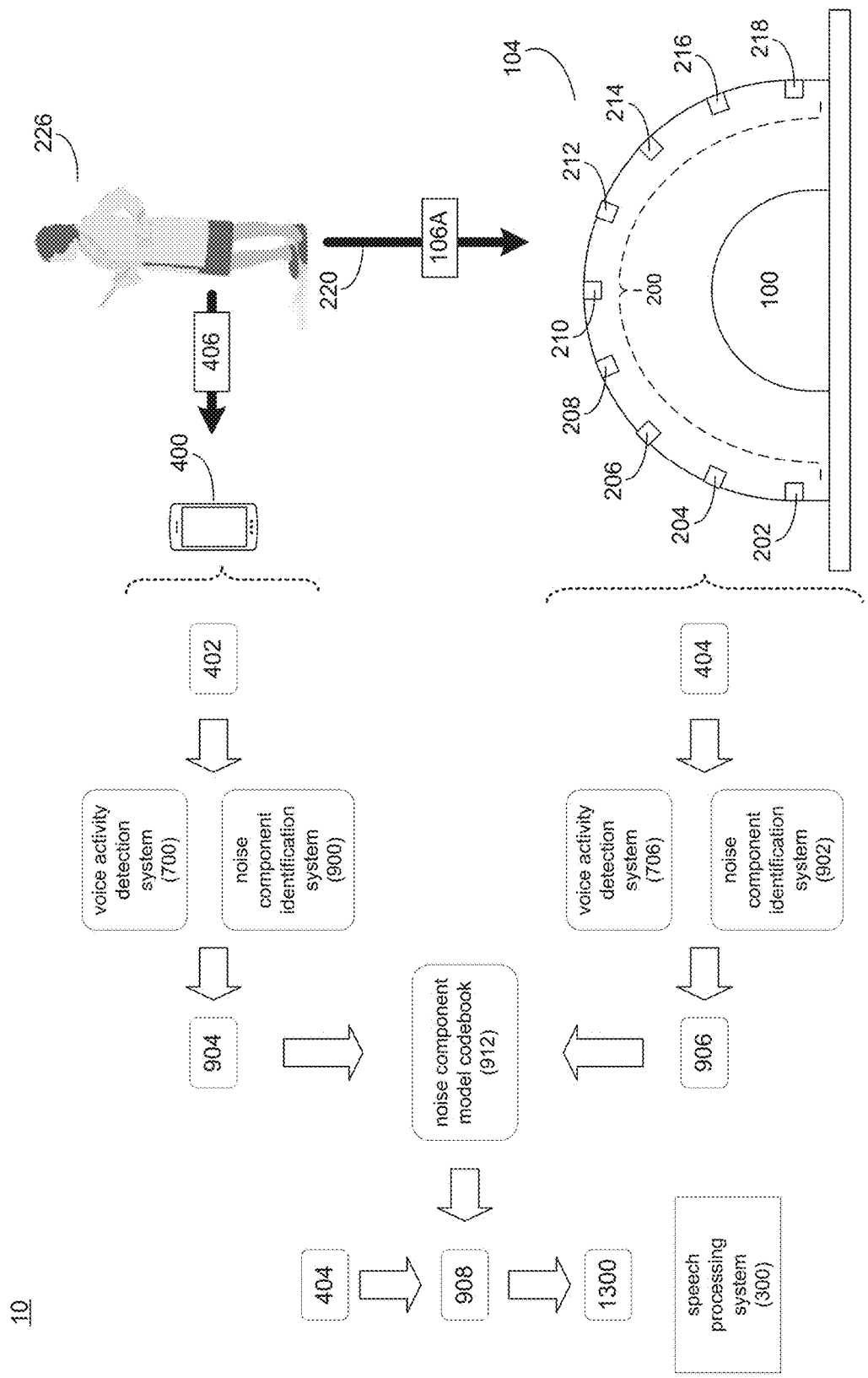
FIG. 13 is a diagrammatic view of a modular ACD system according to one implementation of the data augmentation process of FIG. 1.

Referring also to FIGS. 12-13, data augmentation process 10 may obtain 1200 one or more speech signals from a first device, thus defining one or more first device speech signals. One or more speech signals may be obtained 1202 from a second device, thus defining one or more second device speech signals. A noise component model may be selected 1204 from a plurality of noise component models based upon, at least in part, the one or more first device speech signals and the one or more second device speech signals. The one or more second device speech signals may be augmented 1206, at run-time, based upon, at least in part, the noise component model.

As discussed above and during processing of speech signals in a multi-microphone system at run-time, multiple microphone devices (e.g., handheld electronic device 400 and audio recording system 104) may be configured to process speech signals from the same speaker(s) (e.g., participant 226). As discussed above, each microphone device may record distinct signal characteristics (e.g., reverberation, noise, gain, etc.). When a speech processing system (e.g., speech processing system 300) processes the speech signals from each device, mismatch in these signal characteristics may reduce the performance of the speech processing system (e.g., lower quality speech processing, introduction of erroneous words into transcripts, etc.). Accordingly, data augmentation process 10 may augment, at run-time, speech signals from one microphone device to include at least a portion of the signal characteristics of another microphone device to reduce speech signal mismatch.

In some implementations and as discussed above, data augmentation process 10 may obtain 1200 one or more speech signals from a first device, thus defining one or more first device speech signals. For example, suppose that the first device is e.g., handheld electronic device 400. In this example, as the first device (e.g., handheld electronic device 400) is near or adjacent to the speaker (e.g., participant 226), the first device (e.g., handheld electronic device 400) may be considered a near field microphone system (NFMS). Accordingly, data augmentation process 10 may obtain 1200 one or more speech signals from the first device (e.g., handheld electronic device 400). As discussed above, the first device (e.g., handheld electronic device 400) may include a microphone component or various components configured to capture and record speech signals from one or more speakers (e.g., participant 226).

As shown in FIG. 13, data augmentation process 10 may obtain 1200 one or more speech signals (e.g., speech signal 402). Speech signal 402 may represent at least a portion of audio encounter information 406 received by handheld electronic device 400 from participant 226. Data augmentation process 10 may obtain 1200 and store speech signal 402 as a first device speech signal/first device speech signal recording. As will be discussed in greater detail below, the one or more speech signals (e.g., speech signal 402) may include various signal characteristics associated with the monitored space (e.g., reverberation characteristics, noise characteristics, etc.) as obtained 1200 by the first device (e.g., handheld electronic device 400).

In some implementations, data augmentation process 10 may obtain 1202 one or more speech signals from a second device, thus defining one or more second device speech signals. For example, suppose that the second device is e.g., audio recording system 104. In this example, as the second device (e.g., audio recording system 104) is far or not adjacent to the speaker (e.g., participant 226), the second device (e.g., audio recording system 104) may be considered a far field microphone system (FFMS). Accordingly, data augmentation process 10 may obtain 1202 one or more speech signals from the second device (e.g., audio recording system 104). As discussed above, the second device (e.g., audio recording system 104) may include a plurality of discrete audio acquisition devices (e.g., audio acquisition devices 202, 204, 206, 208, 210, 212, 214, 216, 218) that may form microphone array 200 configured to capture and record speech signals from one or more speakers (e.g., participant 226). As shown in FIG. 13, data augmentation process 10 may obtain 1202 one or more speech signals (e.g., speech signal 404). Speech signal 404 may represent at least a portion of audio encounter information 106A received by audio recording system 104 from participant 226. Data augmentation process 10 may obtain 1202 and store speech signal 404 as a second device speech signal/second device speech signal recording. As will be discussed in greater detail below, the one or more speech signals (e.g., speech signal 404) may include various signal characteristics associated with the monitored space (e.g., reverberation characteristics, noise characteristics, etc.) as obtained 1202 by the second device (e.g., audio recording system 104).

Data augmentation process 10 may process 1208, at run-time, the one or more first device speech signals. For example and as discussed above, the one or more first device speech signals (e.g., speech signal 402) may be obtained 1200 by the first device (e.g., handheld electronic device 400). Processing 1208 the one or more first device speech signals may include detecting 1210 one or more speech active portions from the one or more first device speech signals. For example, the one or more first device speech signals (e.g., first device speech signal 402) may include portions with speech activity and/or portions without speech activity.

Referring again to FIG. 13, data augmentation process 10 may detect 1210, using a voice activity detector system (e.g., voice activity detection system 700), one or more speech active portions of first device speech signal 402. As is known in the art, voice activity detection system 700 may include various algorithms configured to perform noise reduction on a signal and classify various portions of the signal as speech active or speech inactive. Data augmentation process 10 may mark or otherwise indicate which portions of the one or more first device speech signals (e.g., first device speech signal 402) are speech active and/or which portions of the one or more first device speech signals (e.g., first device speech signal 402) are speech inactive.

For example, data augmentation process 10 may generate metadata that identifies portions of first device speech signal 402 that includes speech activity. In one example, data augmentation process 10 may generate acoustic metadata with timestamps indicating portions of first device speech signal 402 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 700 may receive user input to classify particular portions of the signal as speech or non-speech. As will be discussed in greater detail below, data augmentation process 10 may utilize either the one or more speech active portions or one or more speech inactive portions for generating augmented data. For example and as discussed above, data augmentation process 10 may utilize the one or more speech active portions to generate one or more acoustic relative transfer functions that map reverberation components from the first device speech signals to the second device speech signals. Additionally, data augmentation process 10 may utilize the one or more speech inactive portions for generating one or more noise component models configured to represent the spectral signature of noise components from the one or more first device speech signals (e.g., first device speech signal 402).

Processing 1208 the one or more first device speech signals may include identifying 1212 one or more noise components within the one or more first device speech signals. For example and as discussed above, a speech signal (e.g., first speech signal 402) may include various components (e.g., noise components, speech components, etc.). Data augmentation process 10 may identify 1212 one or more noise components within the one or more first device speech signals to replicate the noise spectrum of the first device speech signal. As will be discussed in greater detail below, the one or more noise components may define a noise component model that may be applied to other speech signals (e.g., second device speech signal 404). Accordingly, data augmentation process 10 may map the one or more noise components identified 1212 within the one or more first device speech signal (e.g., first speech signal 402) to the one or more second device speech signals. In this manner, data augmentation process 10 may reduce noise mismatch between the first device speech signals (e.g., first device speech signals 402) and the second device speech signals (e.g., second device speech signals 404).

Identifying 1212 the one or more noise components within the one or more first device speech signals may include filtering the one or more speech inactive portions from the one or more first device speech signals (e.g., first device speech signal 402) as described above. Additionally and/or alternatively, data augmentation process 10 may utilize a noise component identification system (e.g., noise component identification system 900) configured to isolate and identify noise components within first device speech signal 402. In some implementations, the one or more noise components may include a distribution of noise within the one or more first device speech signals. For example, suppose that handheld electronic device 400 is adjacent to patient seating. In this example, first device speech signal 402 may include a distribution of noise components (e.g., as a function of time and/or frequency) based upon, at least in part, the proximity of handheld electronic device to the patient seating.

In some implementations, data augmentation process 10 may label the one or more noise components metadata with timestamps indicating noise components of first device speech signal 402 (e.g., start and end times for each portion). Data augmentation process 10 may label noise components as a time domain label (i.e., a set of samples of the signal include or are speech) or as a set of frequency domain labels (i.e., a vector that gives the likelihood that a particular frequency bin in a certain time frame includes or is noise). Referring again to FIG. 9, data augmentation process 10 may identify 1212 one or more noise components (e.g., noise components 904) within the one or more first device speech signals (e.g., first device speech signals 402). It will be appreciate that noise components 904 may represent any number of noise components for any number of first device speech signals within the scope of the present disclosure.

As discussed above, data augmentation process 10 may process 1214 the one or more second device speech signals. For example and as discussed above, the one or more second device speech signals (e.g., speech signal 404) may be obtained 1202 by the second device (e.g., audio recording system 104). Processing 1214 the one or more second device speech signals may include detecting 1216 one or more speech active portions from the one or more second device speech signals. For example, the one or more second device speech signals (e.g., second device speech signal 404) may include portions with speech activity and/or portions without speech activity.

Referring again to FIG. 13, data augmentation process 10 may detect 1216, using a voice activity detector system (e.g., voice activity detection system 706), one or more speech active portions of second device speech signal 404. Data augmentation process 10 may mark or otherwise indicate which portions of the one or more second device speech signals (e.g., second device speech signal 404) are speech active and/or which portions of the one or more second device speech signals (e.g., second device speech signal 404) are speech inactive. Voice activity detection system 706 may be the same as voice activity detection system 700 and/or may include unique algorithms for detecting speech active portions within the second device speech signals (e.g., second device speech signal 404).

For example, data augmentation process 10 may generate metadata that identifies portions of second device speech signal 402 that includes speech activity. In one example, data augmentation process 10 may generate metadata with timestamps indicating portions of second device speech signal 404 that include speech activity (e.g., start and end times for each portion). Data augmentation process 10 may label speech activity as a time domain label (i.e., a set of samples of the signal include or are speech) or as a set of frequency domain labels (i.e., a vector that gives the likelihood that a particular frequency bin in a certain time frame includes or is speech).

In some implementations, voice activity detection system 706 may include user input to classify particular portions of the signal as speech or non-speech. Data augmentation process 10 may utilize either the one or more speech active portions or one or more speech inactive portions for generating augmented data. For example, data augmentation process 10 may utilize the one or more speech active portions to generate one or more acoustic relative transfer functions that map reverberation components from the second device speech signals to the second device speech signals. Additionally, data augmentation process 10 may utilize the one or more speech inactive portions for generating one or more noise component models configured to represent the spectral signature of noise components from the one or more second device speech signals (e.g., second device speech signal 404).

Processing 1214 the one or more second device speech signals may include identifying 1218 one or more noise components within the one or more second device speech signals. Data augmentation process 10 may identify 1218 one or more noise components within the one or more second device speech signals to generate a noise component model for mapping the noise spectrum of the one or more first device speech signals to the one or more second device speech signals. In this manner, data augmentation process 10 may reduce noise mismatch between the one or more first device speech signals (e.g., first device speech signals 402) and the one or more second device speech signals (e.g., second device speech signal 404). Referring again to FIG. 13, data augmentation process 10 may identify 1218 one or more noise components (e.g., noise components 906) within the one or more second device speech signals (e.g., second device speech signals 404). It will be appreciated that noise components 906 may represent any number of noise components for any number of second device speech signals within the scope of the present disclosure.

Identifying 1218 the one or more noise components within the one or more second device speech signals may include filtering the one or more speech inactive portions from the one or more second device speech signals (e.g., second device speech signal 404) as described above. Additionally and/or alternatively, data augmentation process 10 may utilize a noise component identification system (e.g., noise component identification system 902) configured to isolate and identify noise components within second device speech signal 404. Noise component identification system 902 may be different from or the same as noise component identification system 900. In some implementations, the one or more noise components may include a distribution of noise within the one or more second device speech signals. For example, suppose that audio recording device 104 is adjacent to a doorway. In this example, second device speech signal 404 may include a distribution of noise components (e.g., as a function of time and/or frequency) based upon, at least in part, the proximity of audio recording system 104 to the doorway.

In some implementations, data augmentation process 10 may label the one or more noise components metadata with timestamps indicating noise components of second device speech signal 404 (e.g., start and end times for each portion). Data augmentation process 10 may label noise components as a time domain label (i.e., a set of samples of the signal include or are speech) or as a set of frequency domain labels (i.e., a vector that gives the likelihood that a particular frequency bin in a certain time frame includes or is noise).

In some implementations, data augmentation process 10 may select 1204 a noise component model from a plurality of noise component models based upon, at least in part, the one or more first device speech signals and the one or more second device speech signals. As discussed above, a noise component model may represent a mapping of noise components from one device/acoustic domain to another device/acoustic domain. At run-time, mismatch in the noise characteristics between the first microphone device and the second microphone device may result in degraded performance of a speech processing system. Accordingly, data augmentation process 10 may utilize a noise component model from a codebook of noise component models to augment speech signals of the second microphone device to more generally match the reverberation characteristics of the first microphone device.

Selecting 1204 a noise component model from a plurality of noise component models based upon, at least in part, the one or more first device speech signals and the one or more second device speech signals may include one or more of: selecting 1220 the noise component model based upon, at least in part, speaker location information associated with at least one of the one or more first device speech signals and the one or more second device speech signals; and selecting 1222 the noise component model based upon, at least in part, an acoustic relative transfer function from a plurality of acoustic relative transfer functions.

Referring again to FIG. 13 and as discussed above, data augmentation process 10 may generate and/or store speaker location information (e.g., range, azimuth, elevation, and/or orientation of speakers) associated with each acoustic relative transfer function stored in the noise component model codebook (e.g., noise component model codebook 912). Accordingly, data augmentation process 10 may compare speaker location information from the first device filtered speech active portions (e.g., first device filtered speech active portions 712) and the speaker location information from the second device filtered speech active portions (e.g., second device filtered speech active portions 714) to the stored speaker location information associated with each acoustic relative transfer function stored in the noise component model codebook (e.g., noise component model codebook 912).

Data augmentation process 10 may utilize the speaker location information from the first device filtered speech active portions (e.g., first device filtered speech active portions 712) and the speaker location information from the second device filtered speech active portions (e.g., second device filtered speech active portions 714) to select 1220 a noise component model with sufficiently similar speaker location information. For example, data augmentation process 10 may utilize a predefined similarity threshold when selecting 1220 a noise component model. The predefined similarity threshold may be user-defined, automatically defined by data augmentation process 10, and/or a default value.

As discussed above, data augmentation process 10 may identify one or more acoustic relative transfer functions mapping the reverberation from the one or more first device speech signals to the one or more second device speech signals. For example and as discussed above, data augmentation process 10 may characterize each acoustic relative transfer function codebook entry with the long term spectral features of the background (i.e., average noise spectrum, spectral centroid/flatness, etc.). Using a voice activity detection system (e.g., voice activity detection system 700) and/or a noise component identification system (e.g., noise component identification system 900), data augmentation process 10 may select 1222 the noise component model codebook entry from the noise component model codebook that has similar reverberation characteristics to the one or more first device speech signals (e.g., first device speech signal 402) and/or the second device speech signals (e.g., second device speech signal 404).

Accordingly, data augmentation process 10 may use the codebook of measured noise-based noise component models (e.g., time-frequency gain functions) between the different devices to choose, at run-time, the closest codebook entry for application of the noise component model. The estimation of noise component models at run-time may be difficult and/or not robust, but choosing a pre-defined/measured noise component model from the noise component model codebook may be more robust (i.e., with fewer degrees of freedom).

In some implementations, data augmentation process 10 may augment 1206, at run-time, the one or more second device speech signals based upon, at least in part, the noise component model. For example and as discussed above, mismatch between characteristics of speech signals received by multiple microphone systems may degrade speech processing system performance. Accordingly, data augmentation process 10 may utilize one or more noise component models to augment 1206 one or more second device speech signals to generally match the noise characteristics of the one or more first device speech signals. For example, data augmentation process 10 may augment 1206 second device speech signal 404 received by audio recording system 104 by applying the selected noise component model (e.g., noise component model 908). Applying the selected noise component model (e.g., noise component model 908) may generally include adding the noise component model to second device speech signal 404 to yield augmented second device speech signal 1300. In this example, augmented second device speech signal 1300 may generally include the noise characteristics of the one or more first device speech signals (e.g., first device speech signal 402). Accordingly, data augmentation process 10 may process, via speech processing system 300, augmented second device speech signal 1300 with first device speech signal 402.

Augmenting 1206, at run-time, the one or more second device speech signals based upon, at least in part, the noise component model may include performing 1224 de-reverberation on the one or more second device speech signals based upon, at least in part, the acoustic relative transfer function. For example and as discussed above, augmenting 1206 the one or more second device speech signals may include modifying the reverberation characteristics of the one or more second device speech signals to more closely match the reverberation characteristics of the one or more first device speech signals. Accordingly, data augmentation process 10 may augment 1206 second device speech signal 404 by performing 1224 de-reverberation on second device speech signal 404 based upon, at least in part, acoustic relative transfer function 716. Additionally, it will be appreciated that data augmentation process 10 may add or supplement reverberation or a reverberation distribution to second device speech signal 404 based upon, at least in part, acoustic relative transfer function 716.

Augmenting 1206, at run-time, the one or more second device speech signals based upon, at least in part, the noise component model may include performing 1226 de-noising on the one or more second device speech signals based upon, at least in part, the noise component model. As discussed above, data augmentation process 10 may utilize a selected noise component model (e.g., noise component model 908) from noise component model codebook 912 to augment 1206 second device speech signal 404 to include noise components of first device speech signal 402. In some implementations, applying the selected noise component model may include performing 1226 de-noising on second device speech signal 404 by removing and/or attenuating noise components from the second device speech signal. Additionally, data augmentation process 10 may add or supplement noise components to second device speech signal 404 to more closely match noise characteristics or a noise distribution of first device speech signal 402 based upon, at least in part, the selected noise component model (e.g., noise component model 908).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   obtaining a first set of speech signals from a first device, thus defining one or more first device speech signals;
   obtaining a second set of speech signals from a second device, thus defining one or more second device speech signals;
   selecting an acoustic relative transfer function from a plurality of acoustic relative transfer functions based upon, at least in part, speaker location information associated with at least one of the one or more first device speech signals and the one or more second device speech signals, wherein selecting the acoustic relative transfer function includes:
   processing speaker location information associated with the one or more first device speech signals;
   processing speaker location information associated with the one or more second device speech signals; and
   comparing the speaker location information associated with the one or more first device speech signals and the speaker location information associated with the one or more second device speech signals to speaker location information associated with the plurality of acoustic relative transfer functions from an acoustic relative transfer function codebook; and
   selecting the acoustic relative transfer function with speaker location information that is within at least a predefined similarity threshold of the speaker location information associated with the one or more first device speech signals and the speaker location information associated with the one or more second device speech signals; and
   augmenting, at run-time, the one or more second device speech signals to match reverberation properties of the one or more first device speech signals based upon, at least in part, the acoustic relative transfer function.

2. The computer-implemented method of claim 1, further comprising:
   processing, at run-time, the one or more first device speech signals; and
   processing, at run-time, the one or more second device speech signals.

3. The computer-implemented method of claim 2, wherein processing the one or more first device speech signals includes:
   detecting one or more speech active portions from the one or more first device speech signals;
   identifying a speaker associated with the one or more speech active portions from the one or more first device speech signals; and
   applying signal filtering to the one or more speech active portions associated with a predefined signal bandwidth, thus defining one or more first device filtered speech active portions.

4. The computer-implemented method of claim 2, wherein processing the one or more second device speech signals includes:
   detecting one or more speech active portions from the one or more second device speech signals;
   identifying a speaker associated with the one or more speech active portions from the one or more second device speech signals; and
   applying signal filtering to the one or more speech active portions associated with a predefined signal bandwidth, thus defining one or more second device filtered speech active portions.

5. The computer-implemented method of claim 1, wherein selecting the acoustic relative transfer function from the plurality of acoustic relative transfer functions based upon, at least in part, the one or more first device speech signals and the one or more second device speech signals includes one or more of:
   estimating the acoustic transfer function based upon, at least in part, the one or more first device speech signals and the one or more second device speech signals; and
   selecting the acoustic transfer function based upon, at least in part, a noise component model associated with the at least one of the one or more first device speech signals and the one or more second device speech signals.

6. The computer-implemented method of claim 5, wherein augmenting, at run-time, the one or more second device speech signals based upon, at least in part, the acoustic relative transfer function includes performing denoising on the one or more second device speech signals based upon, at least in part, the noise component model.

7. The computer-implemented method of claim 1, wherein augmenting, at run-time, the one or more second device speech signals based upon, at least in part, the acoustic relative transfer function includes performing dereverberation on the one or more second device speech signals based upon, at least in part, the acoustic relative transfer function.

8. A computer program product residing on a non-transitory computer readable medium having a plurality of instructions stored thereon which, when executed by a processor, cause the processor to perform operations comprising:
   obtaining a first set of speech signals from a first device, thus defining one or more first device speech signals;
   obtaining a second set of speech signals from a second device, thus defining one or more second device speech signals;
   selecting an acoustic relative transfer function from a plurality of acoustic relative transfer functions based upon, at least in part, the one or more first device speech signals and the one or more second device speech signals selecting the acoustic transfer function based upon, at least in part, speaker location information associated with at least one of the one or more first device speech signals and the one or more second device speech signals, wherein selecting the acoustic relative transfer function includes:
   processing speaker location information associated with the one or more first device speech signals;
   processing speaker location information associated with the one or more second device speech signals; and
   comparing the speaker location information associated with the one or more first device speech signals and the speaker location information associated with the one or more second device speech signals to speaker location information associated with the plurality of acoustic relative transfer functions from an acoustic relative transfer function codebook; and
   selecting the acoustic relative transfer function with speaker location information that is within at least a predefined similarity threshold of the speaker location information associated with the one or more first device speech signals and the speaker location information associated with the one or more second device speech signals; and
   augmenting, at run-time, the one or more second device speech signals to match reverberation properties of the one or more first device speech signals based upon, at least in part, the acoustic relative transfer function.

9. The computer program product of claim 8, wherein the operations further comprise:
processing, at run-time, the one or more first device speech signals; and
processing, at run-time, the one or more second device speech signals.

10. The computer program product of claim 9, wherein processing the one or more first device speech signals includes:
detecting one or more speech active portions from the one or more first device speech signals;
identifying a speaker associated with the one or more speech active portions from the one or more first device speech signals; and
applying signal filtering to the one or more speech active portions associated with a predefined signal bandwidth, thus defining one or more first device filtered speech active portions.

11. The computer program product of claim 9, wherein processing the one or more second device speech signals includes:
detecting one or more speech active portions from the one or more second device speech signals;
identifying a speaker associated with the one or more speech active portions from the one or more second device speech signals; and
applying signal filtering to the one or more speech active portions associated with a predefined signal bandwidth, thus defining one or more second device filtered speech active portions.

12. The computer program product of claim 8, wherein selecting the acoustic relative transfer function from the plurality of acoustic relative transfer functions based upon, at least in part, the one or more first device speech signals and the one or more second device speech signals includes one or more of:
estimating the acoustic transfer function based upon, at least in part, the one or more first device speech signals and the one or more second device speech signals;
selecting the acoustic transfer function based upon, at least in part, a noise component model associated with the at least one of the one or more first device speech signals and the one or more second device speech signals.

13. The computer program product of claim 12, wherein augmenting, at run-time, the one or more second device speech signals based upon, at least in part, the acoustic relative transfer function includes performing de-noising on the one or more second device speech signals based upon, at least in part, the noise component model.

14. The computer program product of claim 8, wherein augmenting, at run-time, the one or more second device speech signals based upon, at least in part, the acoustic relative transfer function includes performing de-reverberation on the one or more second device speech signals based upon, at least in part, the acoustic relative transfer function.

15. A computing system comprising:
a memory; and
a processor configured to obtain a first set of speech signals from a first device, thus defining one or more first device speech signals, wherein the processor is further configured to obtain a second set of speech signals from a second device, thus defining one or more second device speech signals, wherein the processor is further configured to select an acoustic relative transfer function from a plurality of acoustic relative transfer functions based upon, at least in part, speaker location information associated with at least one of the one or more first device speech signals and the one or more second device speech signals, wherein selecting the acoustic relative transfer function includes:
processing speaker location information associated with the one or more first device speech signals;
processing speaker location information associated with the one or more second device speech signals; and
comparing the speaker location information associated with the one or more first device speech signals and the speaker location information associated with the one or more second device speech signals to speaker location information associated with the plurality of acoustic relative transfer functions from an acoustic relative transfer function codebook; and
selecting the acoustic relative transfer function with speaker location information that is within at least a predefined similarity threshold of the speaker location information associated with the one or more first device speech signals and the speaker location information associated with the one or more second device speech signals; and
augmenting, at run-time, the one or more second device speech signals to match reverberation properties of the one or more first device speech signals based upon, at least in part, the acoustic relative transfer function, and wherein the processor is further configured to augment, at run-time, the one or more second device speech signals to match reverberation properties of the first device speech signals based upon, at least in part, the acoustic relative transfer function.

16. The computing system of claim 15, wherein the processor is further configured to:
process, at run-time, the one or more first device speech signals; and
process, at run-time, the one or more second device speech signals.

17. The computing system of claim 16, wherein processing the one or more first device speech signals includes:
detecting one or more speech active portions from the one or more first device speech signals;
identifying a speaker associated with the one or more speech active portions from the one or more first device speech signals; and
applying signal filtering to the one or more speech active portions associated with a predefined signal bandwidth, thus defining one or more first device filtered speech active portions.

18. The computing system of claim 15, wherein processing the one or more second device speech signals includes:
detecting one or more speech active portions from the one or more second device speech signals;
identifying a speaker associated with the one or more speech active portions from the one or more second device speech signals; and
applying signal filtering to the one or more speech active portions associated with a predefined signal bandwidth, thus defining one or more second device filtered speech active portions.

19. The computing system of claim 15, wherein selecting the acoustic relative transfer function from the plurality of acoustic relative transfer functions based upon, at least in part, the one or more first device speech signals and the one or more second device speech signals includes one or more of:

estimating the acoustic transfer function based upon, at least in part, the one or more first device speech signals and the one or more second device speech signals; and selecting the acoustic transfer function based upon, at least in part, a noise component model associated with the at least one of the one or more first device speech signals and the one or more second device speech signals.

20. The computing system of claim 19, wherein augmenting, at run-time, the one or more second device speech signals based upon, at least in part, the acoustic relative transfer function includes performing de-noising on the one or more second device speech signals based upon, at least in part, the noise component model.

* * * * *